(12) United States Patent
Richert et al.

(10) Patent No.: US 10,352,297 B2
(45) Date of Patent: Jul. 16, 2019

(54) WIND POWER INSTALLATION AND METHOD FOR ADJUSTING THE ROTOR ROTATION AXIS

(71) Applicant: SKYWIND GmbH, Büdelsdorf (DE)

(72) Inventors: Frank Richert, Stedesand (DE); Sebastian Pflaum, Maisach (DE)

(73) Assignee: SKYWIND GMBH, Büdelsdorf (DE)

( * ) Notice: Subject to any disclaimer, the term of this patent is extended or adjusted under 35 U.S.C. 154(b) by 336 days.

(21) Appl. No.: 15/342,398

(22) Filed: Nov. 3, 2016

(65) Prior Publication Data

US 2017/0074246 A1 Mar. 16, 2017

Related U.S. Application Data

(63) Continuation of application No. 13/808,401, filed as application No. PCT/EP2011/003383 on Jul. 7, 2011, now abandoned.

(30) Foreign Application Priority Data

Jul. 7, 2010 (DE) ........................ 10 2010 031 081

(51) Int. Cl.
*F03D 7/02* (2006.01)
*F03D 13/40* (2016.01)
(Continued)

(52) U.S. Cl.
CPC ......... *F03D 7/0216* (2013.01); *F03D 7/0208* (2013.01); *F03D 7/0264* (2013.01);
(Continued)

(58) Field of Classification Search
None
See application file for complete search history.

(56) References Cited

U.S. PATENT DOCUMENTS 4,297,075 A 10/1981 Jacobs et al.
4,311,434 A 1/1982 Abe
(Continued)

FOREIGN PATENT DOCUMENTS

DE 2753956 3/1979
DE 19916454 10/2000
(Continued)

OTHER PUBLICATIONS

International Search Report for Application No. PCT/EP2011/003383 dated Nov. 11, 2011.
(Continued)

*Primary Examiner* — Christopher Verdier
*Assistant Examiner* — Jason G Davis
(74) *Attorney, Agent, or Firm* — Haug Partners LLP

(57) ABSTRACT

A wind power installation with a rotor which has two or more rotor blades and which is rotatably bearing-supported for rotation around a rotor rotation axis. The rotor is connected to a generator for generating electrical power. The rotor and the generator form a part of a turbine which is received by a turbine carrier. The turbine carrier is rotatably arranged at a supporting structure. The turbine is movably mounted in the turbine carrier via a bearing device so that the spatial position of the turbine in the turbine carrier can be modified. A pivoting range of the turbine corresponding to a pivoting range of the rotor rotation axis includes a first angle range and a second angle range relative to a reference plane, and the entire pivoting range is at least 120°.

11 Claims, 12 Drawing Sheets

(51) Int. Cl.
  *F03D 80/70* (2016.01)
  *F03D 9/25* (2016.01)
  *F03D 13/20* (2016.01)
  *H02K 7/18* (2006.01)
  *H02P 9/04* (2006.01)

(52) U.S. Cl.
  CPC .............. *F03D 9/25* (2016.05); *F03D 13/20* (2016.05); *F03D 13/40* (2016.05); *F03D 80/70* (2016.05); *H02K 7/1838* (2013.01); *H02P 9/04* (2013.01); *F05B 2220/706* (2013.01); *F05B 2230/70* (2013.01); *F05B 2230/80* (2013.01); *F05B 2240/14* (2013.01); *F05B 2240/915* (2013.01); *F05B 2240/916* (2013.01); *F05B 2260/40311* (2013.01); *F05B 2270/32* (2013.01); *F05B 2270/331* (2013.01); *Y02E 10/723* (2013.01); *Y02E 10/725* (2013.01); *Y02E 10/728* (2013.01); *Y02P 70/523* (2015.11)

(56) References Cited

U.S. PATENT DOCUMENTS

| | | |
|---|---|---|
| 6,979,175 B2 | 12/2005 | Drake |
| 2001/0038207 A1 | 11/2001 | Willis et al. |
| 2002/0070558 A1 | 6/2002 | Johann |
| 2010/0083604 A1 | 4/2010 | Vangsy et al. |
| 2010/0117368 A1 | 5/2010 | Benito et al. |
| 2013/0106109 A1 | 5/2013 | Richert et al. |
| 2017/0074246 A1 | 3/2017 | Richert et al. |

FOREIGN PATENT DOCUMENTS

| | | |
|---|---|---|
| DE | 10205988 | 9/2003 |
| EP | 1101934 | 5/2001 |
| EP | 1101936 | 5/2001 |
| EP | 2014912 | 1/2009 |
| EP | 2 591 228 | 5/2013 |
| FR | 2916785 | 12/2008 |
| WO | WO 8204466 | 12/1982 |
| WO | WO 95/00757 | 1/1995 |
| WO | WO 9610130 | 4/1996 |
| WO | WO 2008/089763 | 7/2008 |
| WO | WO 2008/148874 | 12/2008 |
| WO | WO 2009/056701 | 5/2009 |
| WO | WO 2010/028340 | 3/2010 |
| WO | WO 2012/003985 | 1/2012 |

OTHER PUBLICATIONS

EPO Examination Report for Application No. EP 11731166.0—1610 dated Jun. 10, 2016.
Office Action issued by the Canadian Patent Office for application No. 2,823,574 dated Apr. 18, 2017.
EPO Office Action for application No. 11731266.0 dated Apr. 7, 2017.

WIND POWER INSTALLATION AND METHOD FOR ADJUSTING THE ROTOR ROTATION AXIS

The present application is a continuation of U.S. patent application Ser. No. 13/808,401, now abandoned, which claims priority from PCT Patent Application No. PCT/EP2011/003383 filed on Jul. 7, 2011, which claims priority from German Patent Application No. DE 10 2010 031 081.6 filed on Jul. 7, 2010, the disclosures of which are incorporated herein by reference in their entirety.

FIELD OF THE INVENTION

The present invention relates to a wind power installation. The invention also relates to a method for operating the wind power installation and to measures associated with an assembly or disassembly of the wind power installation.

It is noted that citation or identification of any document in this application is not an admission that such document is available as prior art to the present invention.

Wind power installations based on different concepts have been known for some time. Reference is made by way of example to the known prior art, including U.S. Pat. No. 6,979,175, EP 2 014 912, DE 199 16 454 A1, DE 27 53 956 B1, WO 82/04466, WO 2008/148874 A1, DE 102 05 988 B4, US 2001/0038207 A1, EP 1101 936 B1, EP 1 101 934 B1, and WO 96/10130. Reference is also made to Erich Hau, Windkraftanlagen [Wind Turbines], 1995 (ISBN 3-540-57430-1).

Generally, in previous wind power installations a main frame which receives the rotor with rotor blades, a generator and/or possibly gearboxes, and the like, is fixedly anchored atop a tower of the wind power installation and is preferably supported on a yaw bearing to enable adjustment of the rotor and, therefore, of the main frame in every direction so that the wind can flow against the rotor of the wind power installation in an optimal manner. To adjust the main frame, drives are provided for yaw adjustment which bring the rotor and, therefore, the main frame into a desired position relative to the wind by continuously adapting to the wind direction.

If there is a very sharp increase in wind, the total load on the unit comprising rotor, generator and main frame can become so great that the installation reaches an overload range which can ultimately result in damage to the installation but can at least also lead to an overloading of individual parts of the wind power installation.

In all wind power installations currently in operation which exceed a certain power rating, e.g., more than 500 kW, and are therefore not considered to be small wind power installations or medium wind power installations, the rotor of the wind power installation is generally arranged in front of the tower of the wind power installation considered in wind direction, and the rotor comprises at least one rotor blade, preferably two or three rotor blades. The rotor rotates around a substantially horizontal axis which can also be inclined by a few degrees relative to the tower.

During operation of the wind power installation, it is found that with continuously increasing wind speed not only does the pressure on the rotor blades of the rotor increase, but the distance between the rotor blade and tower as the rotor blade sweeps past the tower decreases.

Therefore, in almost all larger wind power installations, i.e., wind power installations with a nominal power of more than 300 or 500 kW, the rotor axis is adjusted to a specific fixed rotor axis angle, e.g., in the range of 4° to 8°, preferably 5° to 7°, relative to the tower of the wind power installation in order to reliably prevent a collision between a rotor blade and the tower when the rotor blade sweeps past the tower. By tilting the rotor axis, the rotor surface that is inclined toward the wind is reduced and the wind energy which can be received by the rotor, in particular in the range of wind speeds between 0 and 10 m/s, is therefore reduced.

When the rotor axis is tilted, the position of the centers of mass of the rotor blades leads to an alternating load on the rotor blade connection and drivetrain. The drivetrain is formed by the rotor and by the generator coupled to the rotor, which are preferably connected to one another via a gearbox.

Since the wind speed also increases with increasing height above the ground, the rotor blades in a typical "12-o'clock position" are subjected to a higher force than in a typical 6-o'clock position because of the higher wind speeds prevailing at that height. Therefore, the different wind speeds swept by the rotor or the blades of the rotor ultimately lead to alternating loads in the drivetrain.

WO 2009/056701 A2 shows a wind power installation with two rotor blades which can be dismantled in that the rotor, together with the rotor blades, is lowered from the nacelle atop the tower on which the wind power installation is provided by means of cable controls which are guided in the tower. The rotor blades are positioned and secured in each case by a cable or the like when lowered, and the rotor is guided away from the tower at a distance therefrom along two guide cables. The tractive forces acting radial to the tower or on the nacelle during disassembly are absorbed and conducted into the ground by three cables which brace and secure the tower laterally. The rotor blades can be set down upon the ground on a specially designed, contoured rotor blade support.

A method for raising a nacelle of a wind power installation into the operational position by means of an external mechanism is known from US 2009/0087311 A1, wherein the mechanism for lifting the nacelle is arranged at the foot of the tower of the wind power installation and is constructed telescopically. The nacelle is guided along the tower when lifted.

For maintenance, repair or dismantling of a wind power installation, there is a need to convey the wind power installation to the ground, e.g., because maintenance cannot be performed using a helicopter only, or because repair or replacement of certain components is not feasible without complete disassembly. One difficulty consists in providing the crane that is normally required for disassembly of the rotor or the entire drivetrain. Due to limited availability, this may lead to extended downtime of the wind power installation and therefore to a loss of revenue.

Rotor systems having three or more rotor blades can be raised and lowered from a tower or other supporting structure by crane; however, with the newer, increasingly larger rotors and the resulting heavier nacelles and increasingly higher supporting structures (towers), increasingly heavier cranes and larger cranes with higher capacity and greater lifting heights must be used. This approach is very costly and time-consuming, and the handling of the nacelles on these cranes, as well as the handling of the cranes themselves, is difficult and fraught with risks.

FR 2 916 785 A1 shows a dismantling device for a wind power installation which can be dismantled in that a hinge around which the greater part of the tower, together with the nacelle or wind power installation and the rotor blades, can be pivoted and lowered to the ground is provided in the region of the foot of the tower on which the wind power installation is mounted. The high weight forces which occur in so doing and the bending moments acting on the tower can be contained by providing two levers which are constructed with a length in the range of half of the height of the tower. Cables guided over the levers engage at the top of the tower and can be manipulated from the foot of the tower by cable controls.

For maintenance or repair or when dismantling the wind power installation, it is generally necessary that the parts of the wind power installation which are arranged in the region of the top of the tower be lowered to the ground in the area surrounding the tower. Apart from the cost, the availability of cranes suitable for this purpose also presents a problem. In particular, in case of damage to wind power installations, the duration of downtime increases along with the time required for procuring a suitable crane. The wind power installation cannot be used during this time resulting in significant downtimes.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Therefore, it is the object of the invention to design a wind power installation of the type mentioned above in such a way that it is possible to lower or to raise parts of the wind power installation to the region of the top of the tower in a simple manner and in a short time. Another object of the invention is to configure the wind power installation in such a way that parts of the wind power installation can be selectively displaced and arranged at different positions of the tower.

According to the invention, the wind power installation includes a rotor which has two or possibly more rotor blades and which is rotatably bearing-supported for rotation around a rotor rotation axis, wherein the rotor is connected to a generator for generating electrical power, and the rotor and the generator form a part of a turbine which is received by a turbine carrier, and the turbine carrier is rotatably arranged at a supporting structure, wherein the turbine is movably mounted in the turbine carrier by means of a bearing device so that the spatial position of the turbine in the turbine carrier can be modified, and a pivoting range of the turbine corresponding to a pivoting range of the rotor rotation axis includes a first angle range and a second angle range relative to a reference plane, and the entire pivoting range is at least 120°.

It is ensured by means of the arrangement according to the invention that the wind power installation can be rotated or tilted by an angle in the range from 0 to at least 120 degrees (total angle range), namely in such a way that this wind power installation can be moved and displaced optimally and in a space-saving manner along a supporting structure such as the tower of the wind power installation, and it can be ensured independently on the other hand that rotor blade connections in a wind power installation can be optimally aligned with a rotor blade which is to be assembled in certain situations.

In particular, it can be ensured by the above-mentioned features of the invention that in addition to a rotor axis inclination of about 4° to 10° (within a first angle range) relative to the horizontal (reference plane H) which is usual for operation, other tilt angles or angles of inclination which facilitate or enable assembly can also be adjusted according to a second angle range, that is, for example, also tilting positions in the range of vertical rotor axis inclination. In so doing, individual rotor blades can be mounted or dismantled in a simple manner, also in cases where the ground may be inclined, in that the position or orientation of the respective rotor blade is adjusted in relation to the ground especially for this case by means of the tilt angle. The rotor can be assembled on the ground beforehand completely and in a simple manner. Also, as regards the assembly/disassembly of other components the wind power installation can be tilted or rotated in such a way that, e.g., the installation of a (replacement) gearbox is facilitated. To this end, the wind power installation in its entirety (or without components which have already been removed in order to install the gearbox) can be lowered, for example, over a (replacement) gearbox prepared on an assembly site in an assembly position with the correct angular alignment of the rotor axis, and the (replacement) gearbox can then be coupled directly to the wind power installation. Lifting and aligning by means of a crane is not required. In the present specification, the terms assembly and disassembly are used synonymously with the terms maintenance and/or repair, as the same or similar measures are to be undertaken in all of these cases.

Further, wind power installations with multi-blade rotors can be pulled up or lowered to the ground close to the supporting structure, i.e., without requiring much space. In this regard, the space requirement is also small insofar as when a wind power installation is constructed, the rotor blades can be attached to the rotor on the ground in an assembly position immediately adjacent to the supporting structure (tower) and can then be displaced in this orientation vertically upward close alongside the supporting structure and need not be tilted until at a height at which the blades can no longer collide with adjacent objects when tilted. Also, this does not exclude a rotation of the rotor relative to the vertical axis of the supporting structure around the supporting structure. In the solution according to the invention, a vertical displacement and a pivoting are possible with one and the same device without additional means. A displacement of parts of the wind power installation is not dependent upon the rotation (pivoting or tilting) of the turbine, for example.

In the wind power installation, the bearing device can comprise a pivot bearing, and the turbine can be supported by means of the pivot bearing so as to be pivotable around a rotation axis. The bearing device for the pivoting of the turbine (T) can also have a mechanical device which may include a four-bar linkage, for example.

The turbine carrier can include an actuator for pivoting the turbine around the first angle range during operation of the wind power installation. The turbine carrier and the turbine can include a pivoting device for pivoting the turbine around the second angle range when the wind power installation is not in operation. The turbine carrier can have a further bearing device in which the turbine is rotatably mounted at least temporarily during pivoting in the pivoting range according to the second angle range.

The further bearing device can be designed for temporarily engaging with at least one connection arm arranged at the turbine during pivoting, and the engagement between the turbine and the further bearing device is releasable by means of the pivoting device at the conclusion of the pivoting process.

The pivoting device can have a cable control for movably holding the turbine during the pivoting process and for releasing the engagement at the conclusion of the pivoting process. The pivoting device is also designed to lower the turbine in the pivoted position by means of the cable control.

The turbine carrier can have a displacing device for moving the turbine carrier along the supporting structure between an uppermost position at an upper end of the supporting structure and a lowermost position at the foot of the supporting structure. The turbine carrier can have a holding device for carrying and securing the turbine carrier at any position along the supporting structure. The pivot bearing can be arranged in the vicinity of the center of gravity of the turbine. Further, the pivoting device can comprise first pulleys at the turbine, and the first pulleys can be arranged at the turbine in the vicinity of the center of gravity thereof.

With regard to a method for operating a wind power installation including a rotor which has two or possibly more rotor blades and which is rotatably bearing-supported for rotation around a rotor rotation axis, wherein the rotor is connected to a generator for generating electrical power, and the rotor and the generator form a part of a turbine which is received by a turbine carrier, and the turbine carrier is rotatably bearing-supported on a supporting structure, the invention provides the steps whereby, depending on a detected wind speed during operation of the wind power installation, an actuator connected to the turbine is actuated for adjusting the inclination of the rotor axis within a first angle range relative to a reference plane.

Alternatively, the method for operating a wind power installation includes the steps whereby, depending on the detected wind speed, a displacing device is actuated for lowering the turbine carrier from a first position to further, lower position and holding the turbine carrier in the further position by means of a holding device (not the second position).

Further, the method for operating a wind power installation includes the steps whereby, with the rotor stopped, the turbine is pivoted by actuating a pivoting device according to a predetermined angle range such that the rotation axis of the rotor is approximately perpendicular to a reference plane, and the turbine is lowered from any position along the supporting structure to a lowermost position at the foot of the supporting structure and placed on a ground surface by further actuation of the pivoting device.

The invention basically allows the operation of a wind power installation in which the drivetrain, i.e., the rotor and generator, is adjusted depending on the wind speed to a desired height above the ground. In so doing, the invention proceeds from the fact that as the height above the ground increases, the wind speed also increases and, vice versa, at a low height above the ground the wind speed decreases and the wind power installation is accordingly also able to prevent overloading of the wind power installation in that the drivetrain is adjusted to a desired height so that a very high yield or very high exploitation of wind energy is possible and the installation need not be shut down due to the risk of overload.

The adjustment of the drivetrain, i.e., the adjustment of the height above the ground, can also be carried out during operation of the wind power installation, which means either that the height is adjusted during ongoing operation (i.e., during power generation) or that the height is adjusted during a brief interruption of operation so that the installation can then be switched on again immediately when reaching the desired height above the ground.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The arrangement of a wind power installation will be described in the following with reference to FIGS. 1 to 3.

Figure 1:
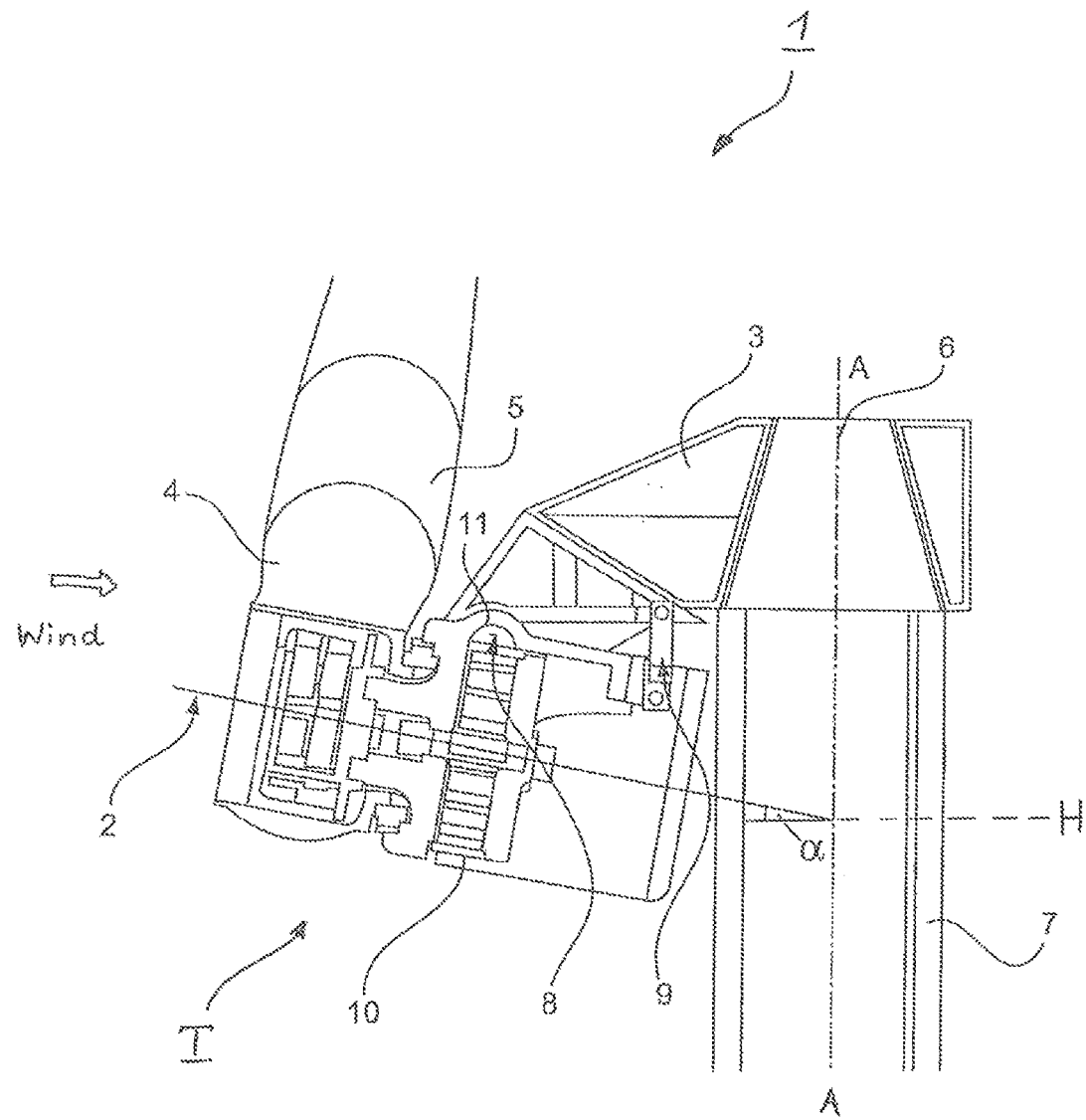
FIG. 1 shows a partial sectional view of a wind power installation according to a first embodiment example of the invention in which a turbine of the wind power installation can be pivoted around a rotation axis relative to a horizontal plane.

The wind power installation 1 shown in FIG. 1 can generally be rotated around three axes of rotation. One of these three axes of rotation is the rotor rotation axis 2 around which a rotor 4 rotates, this rotor 4 having rotor blades 5 generally rotatably arranged thereon. Another is the center axis of the rotor 4. Further, a turbine carrier 3 can rotate corresponding to the center axis A-A 6 of a supporting structure in the form of a tower 7 in order to align the turbine carrier 3 and, therefore, the rotor 4 with rotor blades 5, relative to the wind in an optimal manner (yaw adjustment). Finally, each rotor blade 5 can be rotated around its own longitudinal axis by means of a pitch control (pitch adjustment) so as to adjust the aerodynamic forces on the rotor blades to a desired value.

This type of wind power installation formerly had a fixed angle of the rotor axis relative to the vertical axis A-A of the tower or to a horizontal. Therefore, the arrangement shown in FIG. 1 further comprises a further rotation axis or tilt axis 8, i.e., a rotation axis which extends substantially perpendicular to the rotor rotation axis and which an adjustment of an angle α formed by the rotor rotation axis 2 to an imaginary horizontal. Angle α is known in connection with the operating conditions as the rotor axis angle (or inclination angle or tilt angle) and was generally around 5° to 7° in previous wind power installations and is fixed at construction and fixedly adjusted in known wind power installations. In contrast, tilting or rotation around the further rotation axis 8 can take place in the range of larger angles, e.g., in the range from 0 to 100 degrees, in particular for the disassembly or assembly of any of the components of the wind power installation. The invention is not limited to the angles indicated by way of example, and larger angles can also be adjusted if needed.

On one hand, the entire rotor 4 can be rotated in a downward direction referring to the drawings around the rotation axis 8 with respect to its rotation angle α (small angle, first angle range) or by a substantially greater angle (second angle range). In this way, the rotation axis 8 for rotation angles in the range of larger angles can now coincide with the rotation axis for small rotation angles of, for example, 4° to 8° (FIG. 1). The first angle range and second angle range are contiguous and the resulting total angle range can be at least 120° or even more than 120°.

A fine adjustment of the inclination angle or tilt angle α can then be performed during operation at this one axis. However, the tilt axis and rotation axis can also be separated from one another. For each of the pivoting movements (small angles in operation, large angles for assembly or disassembly), a separate drive or actuator suitable for each can be provided; however, an actuator able to adjust both pivoting movements regardless of whether or not the two axes are coaxial (i.e., coincide with one another) can also be provided. One and the same axis for both the small tilt angles and the large tilt angles can offer the advantage that a fine adjustment of the tilt angle can also be carried out in a simple manner for purposes of assembly, e.g., with a very slow tilting movement, and this can be carried out with an individual actuator or with two special actuators which are optimized specifically for the respective tilting movement.

A drive 9 which is supported on the turbine carrier 3 and which exerts a force on a drivetrain 10 approximately perpendicular to the rotor rotation axis can be provided for carrying out the appropriate adjustment. The drivetrain 10 of the wind power installation 1 comprises the rotor 4 and a generator for converting the rotational energy into electrical power and, in some cases, a gearbox by means of which the rotor and the generator are connected to one another. The totality of elements comprising rotor 4 with rotor blades 5, gearbox, generator and rotor hub will be referred to hereinafter as turbine T.

A pivot bearing 11 which allows the movement of the turbine T around the rotation axis 8 is provided for rotating/pivoting the turbine T around rotation axis 8. The rotational movement is controlled by the drive 9, preferably by a plurality of identical or different drives. A hydraulic cylinder can be used as drive and/or, alternatively, other drive mechanisms can be provided, e.g., electric motors or other rotating or linear moving actuators. Accordingly, the turbine T can be adjusted around the rotation axis 8 to adjust a desired angle α of the rotor rotation axis 2 (corresponding to the turbine rotation axis).

By means of a rotation according to the invention of the rotor 4 around a rotation axis, whether for the purpose of adjusting a desired angle relative to the substantially horizontal reference plane H (also referred to as tilt angle) or for assembly or disassembly, the turbine T can be adjusted, e.g., depending on current wind speed, by a different angle α, and the rotor 4 or the entire turbine T can be assembled or disassembled and serviced in a simple manner, particular in a space-saving manner. For this purpose, the wind speed can also be measured or detected at different heights on the tower 7 by means of suitable devices. In so doing, it is advantageous during operation, for example, that the tilt angle α (inclination angle, pivoting angle) does not assume the value of 5° to 7° until a nominal wind speed or other predetermined wind speed impinging on the wind power installation is reached, but that the tilt angle is smaller, for example, close to zero degrees, in the range of lower wind speeds so that the effective swept area of the rotor blade and, therefore, the efficiency of the wind power installation are kept optimal.

The inventive adjustment of the rotor axis inclination depending upon wind speed is verified by means of a control loop. In this regard, the rotor axis inclination of the wind power installation is controlled, e.g., depending on the instantaneous wind speed $V_{Wind}$, in such a way that, for example, the desired angle or the rotor axis inclination α (from the first angle range) increases as wind speed increases. At low wind speeds of 2-4 m/s, for example, orientation is horizontal and the rotor axis inclination is accordingly α=0.

According to the invention, the wind speed $V_{Wind}$ is converted in a mathematical function for α=f ($V_{Wind}$) to a preset for a rotor axis inclination α to be adjusted and is fed as set value to a suitable controller which then adjusts the desired rotor axis inclination of the rotor and turbine T by means of the drive 9 (actuator).

Further (or alternatively), a dynamic control of the rotor axis inclination can also be carried out during operation. Owing to the different forces acting on the rotor blades which is brought about, e.g., by the different wind speeds depending on height and when the blades pass through the shadow of the tower, a different load is exerted at each revolution of the rotor so that a slightly periodic pendulum motion occurs. According to the invention, by means of a corresponding control of the drive for adjusting the angle of inclination α of the rotor or turbine T, a dynamic, possibly periodic force can be generated which counteracts this pendulum movement and other transient rotor forces. Appropriate damping elements could also be provided.

For this purpose, forces are preferably measured in or on the rotor blades and subtracted from one another. Using a mathematical function $\Delta\alpha_{dyn}=f(\Delta F)$, a dynamic change in the adjusted rotor axis inclination α is calculated therefrom and subtracted from a preset value of the rotor axis inclination $\alpha_{set}$. The current rotor position $_{PosBlade}$ can be additionally included for optimal calculation of $\Delta\alpha_{dyn}$.

Figure 2:
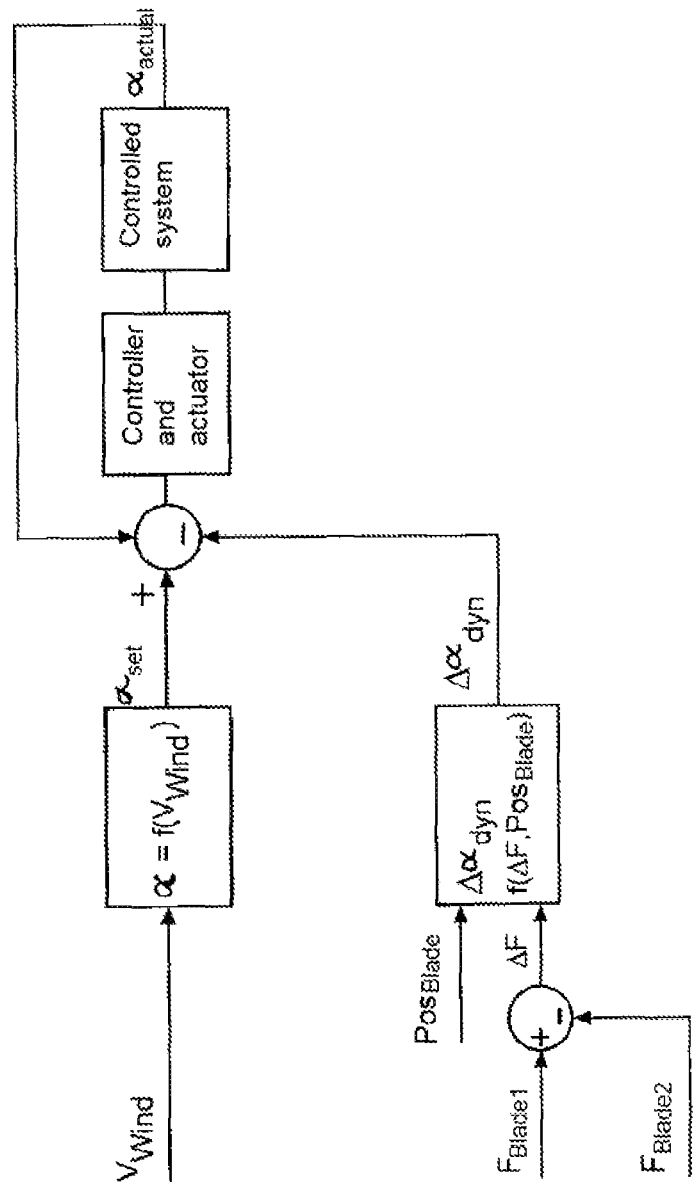
FIG. 2 shows a block diagram illustrating a control structure for controlling a wind power installation according to FIG. 1.

A control structure (control loop) is shown in FIG. 2, where $V_{Wind}$=wind speed, α=tilt angle or angle of inclination, $F_{Blade1}$=force on the first blade, $F_{Blade2}$=force on the second blade, $Pos_{Blade=meas}$=measured blade position, $\alpha_{dyn}$=dynamic tilt angle, and α is the actually adjusted tilt angle or inclination angle from the first angle range. By means of a "controller and actuator" block shown in FIG. 2 and another block designated as "controlled system", the controlled system in the form of drive 9 (FIG. 1) is influenced from values $\alpha_{set}$ and $\Delta\alpha_{dyn}$.

Figure 3:
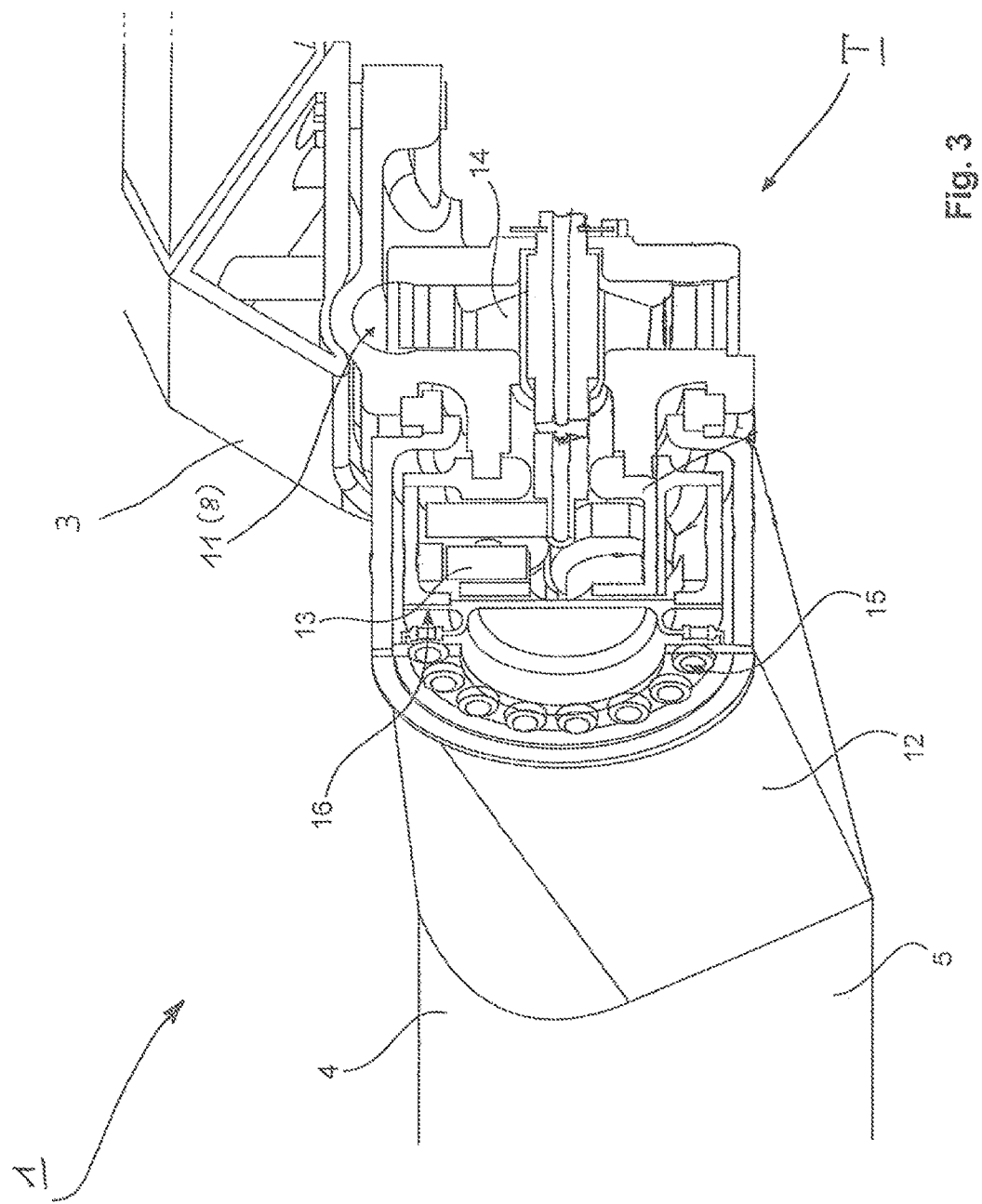
FIG. 3 shows a perspective sectional view of a wind power installation according to the first embodiment example detailing a possible arrangement of the gearbox and generator and a pivot or rotation axis of a wind power installation according to FIG. 1.

FIG. 3 shows a cross section through the wind power installation. The wind power installation comprises the rotor blade 5 which is part of the rotor 4. The rotor 4 includes a rotor hub 35 receiving the gearbox 13 (if any) which receives the forces of the rotor 4 on the input side and delivers them to the rotating part of the generator 14 on the output side. The generator 14 is preferably an asynchronous generator with a squirrel-cage rotor or a synchronous generator which delivers the generated electrical power with a relatively high output voltage, e.g., 10 kV. The gearbox is preferably provided with a dry sump lubrication. As has already been stated above, the above-described arrangement is also referred to as turbine T.

FIG. 3 shows further details of the gearbox 13. It will be seen that an elastomer coupling 15 is provided, which is preferably designed so that the transmission of axial forces on the rotor 4 and deformations of the rotor hub 12 into a gearbox housing 16 are prevented or minimized as far as possible. The gearbox housing can also be held only by means of the elastomer coupling 15, as is shown, or is supported by a bearing (not shown) at a non-rotating planet carrier.

Figure 4:
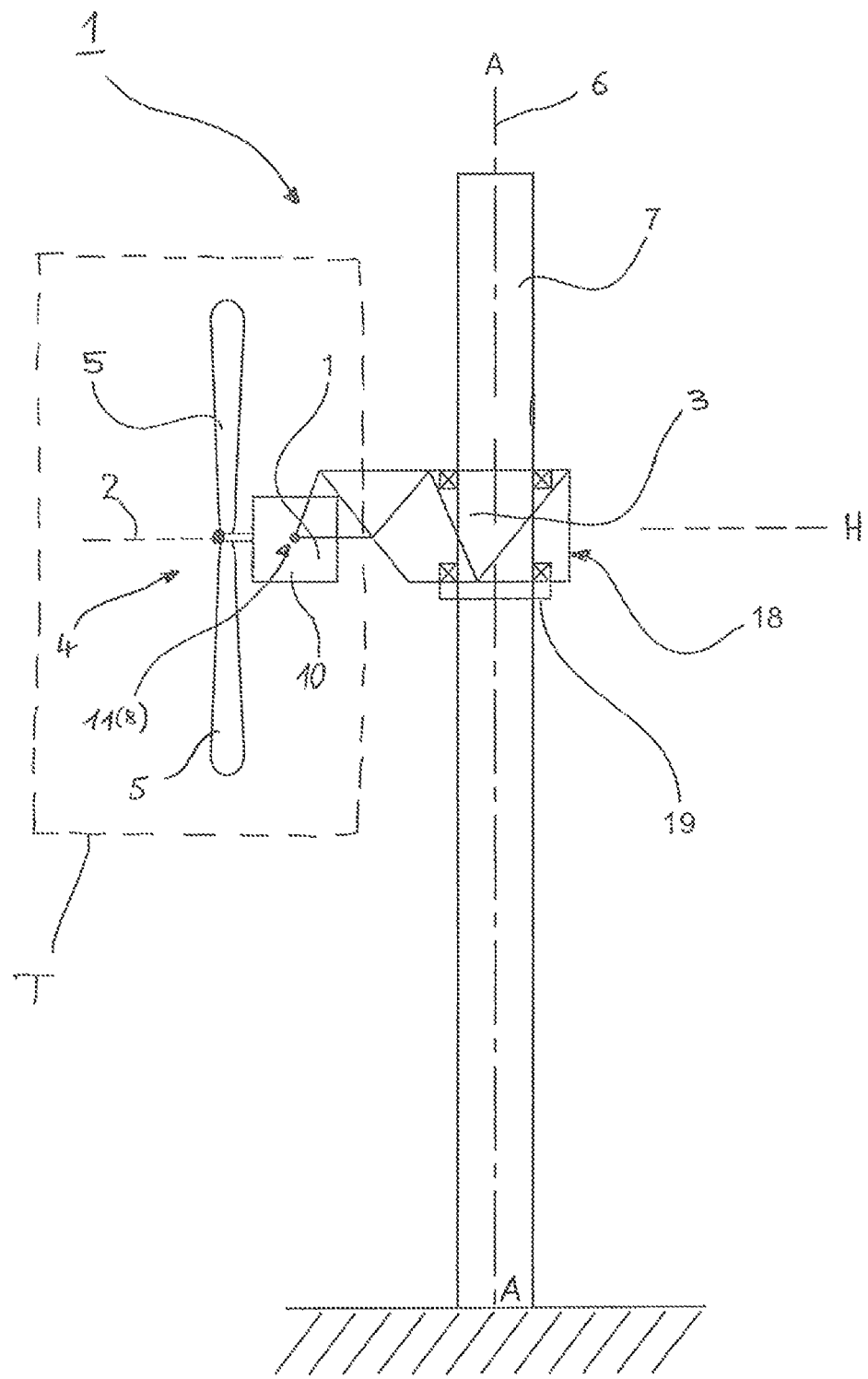
FIG. 4 shows a simplified schematic side view of a bearing structure for supporting the turbine which can be provided in a wind power installation according to the above-mentioned embodiment example.

In a schematic, simplified view, FIG. 4 shows the construction of the wind power installation 1 with features which can also be realized irrespective of the above-described features.

The aim of the arrangement according to FIG. 4 is to provide a functional separation between a conventional wind power installation 1 (comprising turbine, control, etc.) and the tower 7 (supporting structure) thereof and the need for the bearing support of the wind power installation 1 at a determined distance above the ground; and in this case a suitable structure in the form of a bearing structure is used. The bearing structure corresponds to the turbine carrier 3 according to FIG. 1, since the turbine T of the wind power installation is supported by means of the bearing structure so that a predetermined pivoting by angle α (in this instance, the entire angle range which is greater than 120°) is possible.

The purpose of the bearing structure is to adjust the dynamic portion of a wind power installation 1, i.e., rotor 4, generator, gearbox if any, control and subsystems for the latter, e.g., brakes, actuators for the blade adjustment (pitch drives), etc., and thus the entire turbine T to a desired level and, therefore, a predetermined height above the ground. The bearing structure or turbine carrier 3 is supported at the tower 7 of the wind power installation 1 and can rotate the rotor 4, generator, optional gearbox, control, etc. around the vertical axis, i.e., the tower axis A-A 6 (yaw adjustment).

In case of repair work, the entire installation can be moved down the tower 7 to the ground by means of the turbine carrier 3, and in the event of a large storm it is also possible to displace the turbine T—with or without the turbine carrier 3—of the wind power installation 1 from its top position (general upper operating position) farther down to an intermediate position so as to also allow operation of the wind power installation 1 in very strong wind (during a storm, the wind speed close to the ground is lower than at a high altitude above the ground). This will be described in detail in the following with reference to additional drawings.

As is shown by FIG. 4, a displacing device 18 can be provided in the turbine carrier 3 by means of which the turbine T and the turbine carrier 3 can be displaced to a desired height above the ground. Upon reaching the desired position along the longitudinal extension of the tower 7, the turbine carrier 3 with the turbine T can be anchored by means of a holding device 19. The holding device 19 can be part of the turbine carrier 3 or can also be constructed separately. When the wind turns (changing wind direction), the turbine carrier 3 of the turbine T of the wind power installation can be rotated around the vertical axis by the above-mentioned displacing device 18 or by another device.

The displacing device 18 for raising and lowering the turbine T of the wind power installation 1 can comprise a cable system or be formed by rail systems, etc. Also, it is possible that the displacing device has one or more drive motors provided with a pinion which transmits its force to an opposing gear rim that is arranged on the tower of the wind power installation.

The holding device 19 can be formed by pins, clamps, or the like, so that the turbine carrier 3 can be locked at different predetermined heights on the tower 7. Basically, the holding device 19 can support the turbine carrier 3 at any location or position along the tower 7.

Figure 5:
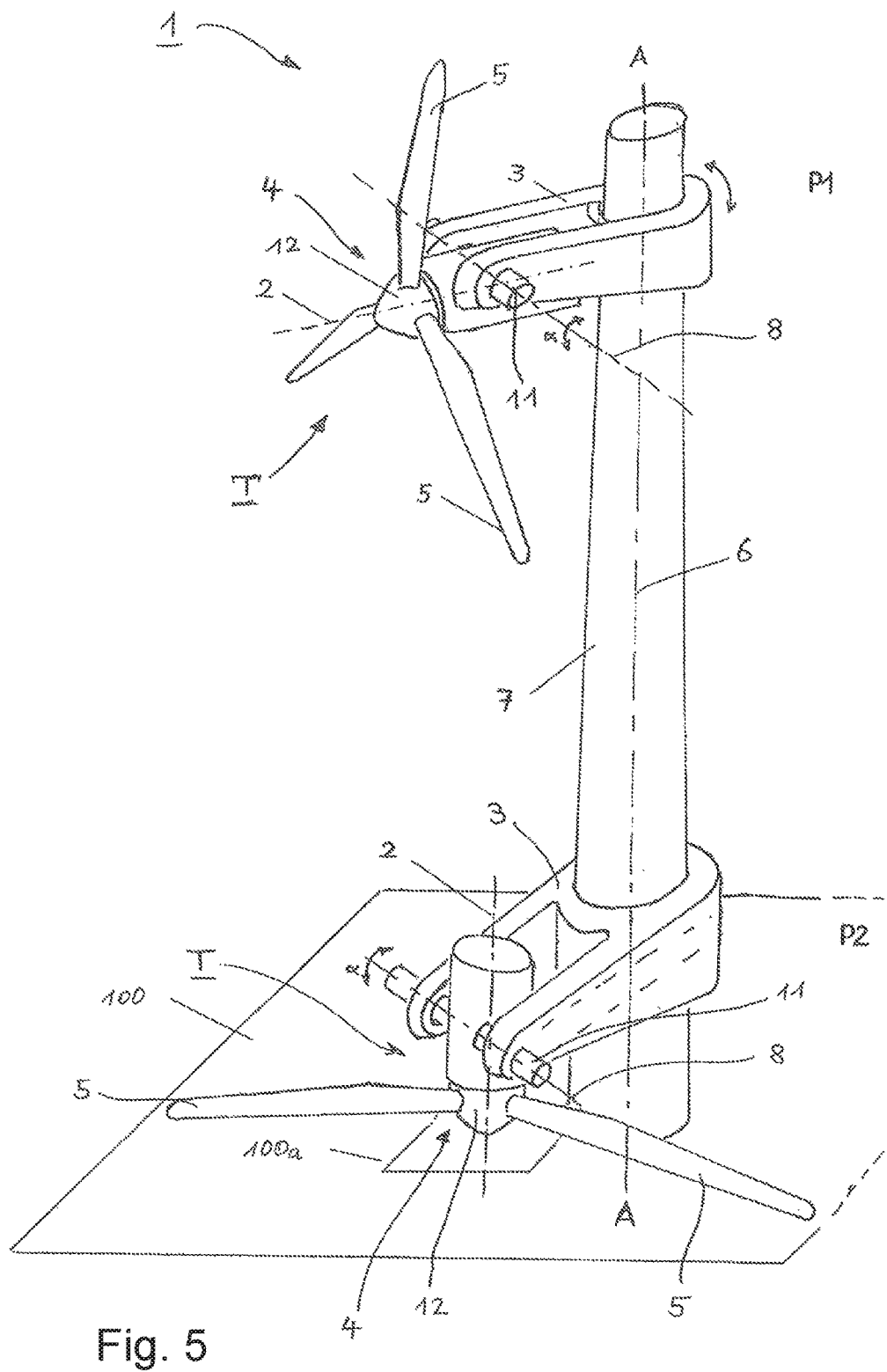
FIG. 5 shows a perspective schematic view showing the wind power installation according to a further embodiment example in which the turbine is pivoted relative to a turbine carrier and is lowered together with the turbine carrier.

In a simplified schematic diagram, FIG. 5 illustrates the possibility of lowering the turbine T and turbine carrier 3 along the tower 7 of the wind power installation 1 selectively as far as the ground close to the foundation of the tower 7. FIG. 5 shows the elements of the wind power installation 1 which are described in the following in the operating position in the upper part of the tower 7 and in the lowered position. The operating position at the uppermost end of the tower 7 is also referred to as a first position P1, and the lowered position at the foot of the tower 7 is referred to as the second position P2. Possible intermediate positions between these maximum and minimum heights are referred to as third position P3. Accordingly, for example, the arrangement in the upper part of FIG. 1 is in the first position P1.

FIG. 5 schematically shows how lowering and pivoting the turbine T of a wind power installation 1 can be carried out. The rotor blades 5 of the rotor 4 of the wind power installation 1 can also remain mounted on the rotor hub 35 of the rotor 4 while pivoting (rotating) the turbine T. When there is a need for technical servicing, e.g., of the generator 14 (FIG. 3) of the wind power installation 1, which generator 14 can be arranged in the turbine carrier 3 as part of the turbine T, the turbine T can be pivoted and lowered without a great expenditure of time and the generator can then be serviced in a simplified manner on the ground without having to dismantle other components. In this regard, the rotor 4 of the turbine T can first be lowered and then pivoted from a substantially vertical plane into a substantially horizontal plane, or else first pivoted and then lowered, depending on which method is appropriate, e.g., depending on the geometry of the rotor blades, the total weight, environmental factors, e.g., wind strength or other factors. In principle, it can be advantageous when pivoting is first carried out at lower heights with lower wind speeds, because then it is highly probable that fewer unexpected forces (e.g., due to shifting aerodynamic forces on the rotor blades during pivoting) will act on the entire device than at great heights in the top region of the tower. In this case, lateral forces acting on the tower 7 can also be avoided.

Aside from the possible pivoting of the turbine T according to the diagram in FIG. 1 by a few degrees (first angle range) to tilt the rotation axis 2 of the rotor in accordance with wind conditions, there now exists the possibility of pivoting the turbine T of the wind power installation 1 by large angles (second angle range of approximately 0° to 10°) in the opposite direction in the range of 0° to greater than 90° or 110°. The bearing structure shown in FIG. 5, which includes the turbine carrier 3 connected (by positive engagement) to the tower 7, is provided for this purpose. The pivot bearing 11 allows a pivoting of the rotatably bearing-supported turbine T not only as shown in FIG. 1 (first angle range) but also according to FIG. 5 (second angle range) so that after the pivoting process the rotation axis 2 of the rotor is approximately parallel to the tower axis A-A 6, and a plane of rotation of the rotor blades 5 is arranged approximately parallel to the ground (of the imaginary horizontal as reference plane H). The simplified diagram in FIG. 5 shows only the basic principle of pivoting the turbine T and lowering the entire unit comprising, for example, turbine T and turbine carrier 3. Thus FIG. 5 shows the turbine carrier 3 in the first and second positions P1 and P2, respectively.

FIG. 5 shows the supporting structure of the wind power installation 1 in detail, for example, in the form of the tower 7 which is erected and anchored on a base 100, e.g., the ground. A wind power installation 1 which is shown here in both an upper (operating) position P1 and a lower position P2 on the ground 100 is provided at the tower 7. The rotor 4 of the turbine T, e.g., with three rotor blades 5, is pivoted in the lower position into a substantially horizontal plane and in particular can be positioned on an assembly site 100$a$ in the immediate vicinity of the tower 7 without requiring much space. In the upper (operating) position, the rotor 4 is arranged in an at least approximately vertical plane with an at least approximately horizontal rotor axis 2. At the mounting site 100$a$, the rotor 4 can be arranged in such a way that the tower 7 is located in an angle segment between two (of three or more) rotor blades 5. A displacement along the tower 7 can also be carried out in this orientation of the rotor blades 5, for example. In case the tower 7 is not aligned exactly orthogonal to the ground 100 so that there is not an approximately 90-degree angle formed between the vertical axis A-A 6 of the tower and the ground 100, e.g., due to unevenness of the ground or the like, a respective rotor blade 5 can also be dismantled close to the fully lowered position before reaching the end position shown in FIG. 5 so that the rotor 4 can be set down, e.g., by only two of three rotor blades. For this purpose, the position of the respective rotor blade can be aligned relative to the ground 100 by tilt angle α shortly before reaching the end position.

Accordingly, the rotor axis 2 can be pivoted (positive rotation angle α) by a few degrees (e.g., 3 to 10 degrees) relative to the horizontal during operation to adjust an optimum operating behavior and a good energy yield from the wind power installation 1 depending upon external factors such as wind strength, for example. These small rotation angles α of the first angle range may be referred to as positive rotation angles. When the turbine T is rotated or pivoted downward (in FIG. 5) around the rotation axis 8, these larger angles α of the second angle range may be referred to as negative angles α in relation to the horizontal (reference plane) H. The pivoting direction or rotating direction around the rotation axis 8 over or under the horizontal can be described in this way. The pivot bearing (bearing device) 11 can be arranged at the turbine carrier 3 and can also be connected thereto so as to be fixed with respect to rotation relative to it and can support the turbine carrier 3 around a tilt axis or rotation axis which corresponds to rotation axis 8. The pivot bearing 11 constitutes a bearing device which is arranged coaxial to the rotation axis 8.

A pivoting movement of the turbine T at the pivot bearing 11 for assembly or disassembly and maintenance can be achieved, for example, by providing an actuator (not shown) which is arranged, for example, between the back side of the turbine carrier 3 that faces the tower 7 during operation and which can act on the turbine carrier 3. The actuator can be constructed, for example, as a hydraulic cylinder, and it can rotate (pivot) the turbine T actively and in a controlled manner either by small positive rotation angles α or large negative rotation angles α for disassembly or assembly.

The actuator can optionally also be arranged in close proximity to the pivot bearing 11 between the one arm (or both arms) of the turbine carrier 3 in the exemplary diagram in FIG. 5 and be supported substantially by itself at the arm of the turbine carrier 3 and can transmit torque into the turbine carrier 3 or pivot bearing 11. Further, this arrangement can make possible a very compact actuator because, regardless of the size of the tilt angle, i.e., the extent of deflection or rotation, the actuator need not significantly change its position or its force application point. The actuator can engage, for example, at a gear rim (not shown) which is arranged on the turbine carrier 3 and formed so as to be partially circular, for instance.

It can also be seen in FIG. 5 that a bearing support of the turbine T of the wind power installation 1 is made possible in such a way that the pivot bearing 11 or rotation axis 8 is arranged at least approximately in the center of gravity of the turbine T or, according to configuration, the rotation axis 8 lies slightly above the center of gravity. The forces required to rotate the turbine T relative to the turbine carrier 3 can be reduced in this way. The diagram in FIG. 5 illustrates the resulting options for rotating (tilting) the turbine T relative to the turbine carrier 3 and displacing the turbine carrier 3 along the length of the tower 7 of the wind power installation 1 so that, on the one hand, an operating position (third position P3) can be adjusted to an intermediate height which is lower than the height of the operating position at the upper end of the tower 7 (first position P1) and, on the other hand, the turbine T and the turbine carrier 3 can be brought all the way down in proximity to the ground 100 for assembly, disassembly or maintenance and repair (second position P2). In so doing, the rotor hub 12 can lie on the ground 100 or in a suitable arrangement for preventing damage.

For rotating or pivoting the turbine T relative to the turbine carrier 3, the rotor 4 is brought into a position such that the tower 7 lies in a gap between two of the plurality of rotor blades 5, and the rotor 4 is held in this position.

Figure 6:
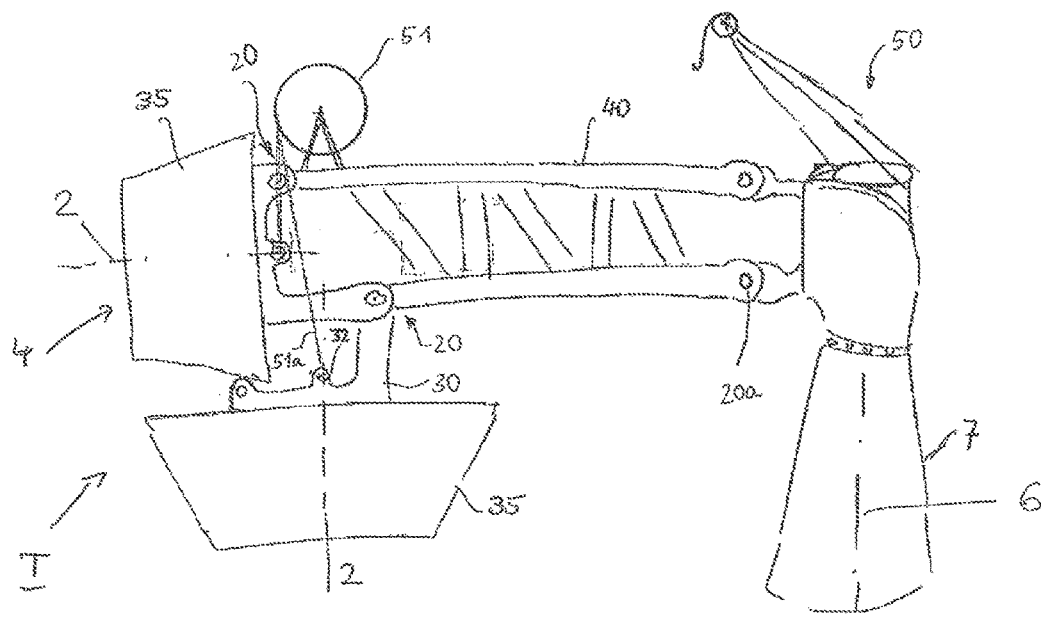
FIG. 6 shows a simplified schematic diagram of a turbine and a turbine carrier which is arranged on a tower of the wind power installation with the possibility of pivoting the turbine.
Figure 6:
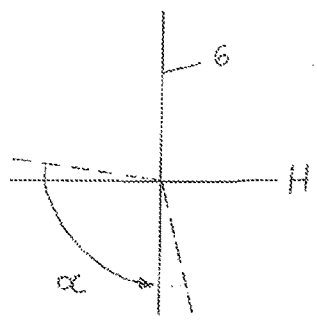

FIG. 6 shows a further embodiment example of the arrangement of the wind power installation 1 having a turbine T and a turbine carrier.

FIG. 6 shows the arrangement of the wind power installation 1 in a simplified, schematic manner in which sizes and proportions are not relevant. The wind power installation 1 according to FIG. 6 comprises a crane 50 or similar device on a tower 7 and/or a cable winch 51 which is provided on a carrier device in the form of the turbine carrier 40 (corresponding to the turbine carrier 3) in order to lower a turbine T of the wind power installation 1 from an upper position (in the vicinity of the upper end of the mast, or default operating position) to a position which is at least close to the ground for special purposes. In the illustrated embodiment example, a rotor hub 35 (corresponding to rotor hub 12) can be supported at (fastened to) a supporting device in the form of tower 7 by two structural component parts 30, 40; also shown are two optional interfaces 20, 20a for connecting or coupling the rotor hub 35 and the receiving device 30 thereof to the tower 7, i.e., between a receiving device 30 (a first structural component part) for the rotor hub 35 and a carrier device 40 (a second structural component part), and between the second structural component part and the top of the tower 7, and the first structural component part can be pivoted relative to the second structural component part around an axis which is arranged in an approximately horizontally extending plane so that the rotor 4 with rotor blades can be rotated or tilted out of a substantially vertically arranged plane into an essentially horizontally arranged plane. FIG. 6 shows the turbine, in this case indicated by the rotor hub 35, in two different positions, i.e., in the operating position on the one hand and in the rotated position (pivoted according to the second angle range) on the other hand.

As regards the term "ground" for a bearing support which is at least close to the ground, reference can be made to a reference surface which corresponds, for example, to the earth's surface or ground 100 (see FIG. 5), whether on land or at sea. The crane 50 or winch 51 can be coupled to the rotor hub 35 and the receiving device 30 thereof; the rotor hub 35 can be uncoupled from a receiving device 30 and/or the carrier device 40. In this regard, a flexible interface 20 with suspension and damping elements does not exclude providing at least one joint which allows a pivoting of the rotor hub 35 (turbine) by an angle (second angle range) such that for disassembly the rotor hub 35 need only be lowered in direction of the ground starting from this pivoted position or, for assembly, need only be raised from the ground in order to be coupled to a carrier device in the form of the turbine carrier 40 or similar structural component part and pivoted into an operative position (e.g., top part of FIG. 5).

In this regard, FIG. 6 shows one and the same rotor hub 35 (representing the turbine) in different positions, i.e., in an operating position in which a flexible interface 20 can also be operative, and in a position from which the rotor hub 35 with receiving device 30 can be lowered for disassembly or maintenance or can be pivoted back into the operating position for assembly and start-up.

FIG. 6 also shows that a cable or the like connecting means 51a of the winch 51 can be connected to the receiving device 30 at a substantially centrally disposed coupling point 32 and that the region or regions in which a flexible interface 20 (flexible elements are not shown explicitly or in their entirety) can be provided need not necessarily lie in one plane. Also not explicitly shown, but indicated by reference numeral 20a, is a second interface and a further coupling unit between the second structural component part, i.e., the turbine carrier 40, and the top of the tower 7. This interface 20a can be constructed similar to interface 20 or can have other kinds of flexible elements, e.g., elements with a primarily damping function. The flexible interface 20 can comprise controllable elements or elements which are not controllable.

Figure 7:
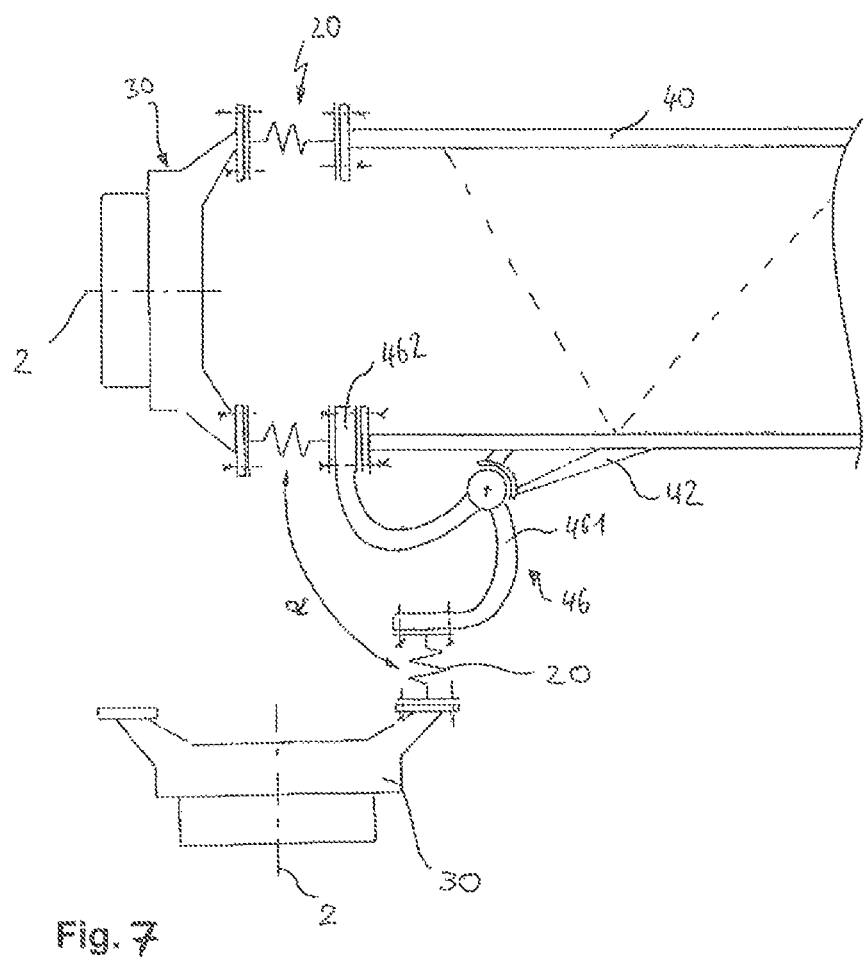
FIG. 7 shows a simplified illustration of an arrangement of the turbine at the turbine carrier with the possibility of pivoting the turbine (in accordance with the second angle range)

FIG. 7 shows a further possibility for rotating the turbine T of the wind power installation 1 represented by the receiving device 30. A joint device 46 is provided, and the joint device 46 is arranged between a part of a flexible interface 20 and the second structural component part 40 and is supported at the second structural component part 40. In particular, a joint device 46 which is supported at the turbine carrier 40, particularly by one or more supports 42, can be provided. The joint device 46 has an articulated arm 461 which is coupled to a flange 462 or which forms a one-piece support together with this flange 462. The articulated arm 461 is at least partially bent so that it can be supported at the turbine carrier 40 but can nevertheless be pivoted in a simple manner between a flange 41 of the turbine carrier 40 and the flexible interface 20, in particular, a flexible element 21. To this end, the flange 462 can be constructed in such a way that it can easily be coupled to the turbine carrier 40 and a receiving device 30 or a rotor bearing (not shown), i.e., so that, e.g., for screw connections, it has through-holes which are arranged in the same position as through-holes at the flange 41 of the turbine carrier 40 and/or at a flange of a flexible element 21.

If the receiving device 30 is now uncoupled from the turbine carrier 40 at all of the interfaces where the joint device 46 is not provided, and if, in addition, the flange 462 of the joint device 46 is uncoupled from the turbine carrier 40, then the receiving device 30 is pivotable relative to the turbine carrier 40 in such a way that a rotor or the entire turbine T (not shown) can be pivoted out of an at least approximately vertical plane (rotation plane of the rotor) into an at least approximately horizontal plane (rotor rotation axis extends approximately vertically). This can be carried out, for example, in that the distance between the receiving device 30 and flanges 41 of the turbine carrier 40 in which the joint device 46 is not provided is increased slowly while pivoting, either by means of some kind of cable control between the receiving device 30 and these flanges 41 or, optionally in addition, via a braking torque which counteracts a rotation of the joint device 46 relative to the carrier device 40. The joint device 46 shown in FIG. 7 is a variant characterized by easy integration in an existing supporting structure, because a joint device of this kind can also be retrofitted, for example, by providing a supporting device 42 at the turbine carrier 40 and in that the flange or flanges 41 is/are offset (e.g., by shortening the turbine carrier 40) by an amount such that, in addition, a flange 461 of the joint device 46 can be arranged between the turbine carrier 40 and the flexible interface 20 without having to shift the flexible interface 20 or modify individual flexible elements 21.

Figure 8:
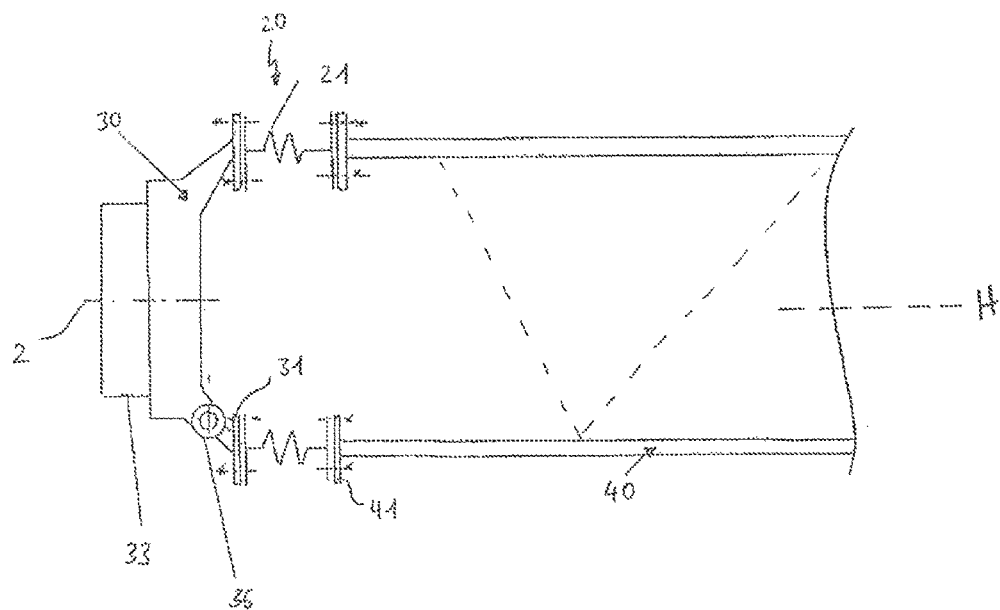
FIG. 8 shows another simplified illustration of an arrangement of the turbine at the turbine carrier with the possibility of pivoting the turbine.
Figure 9:
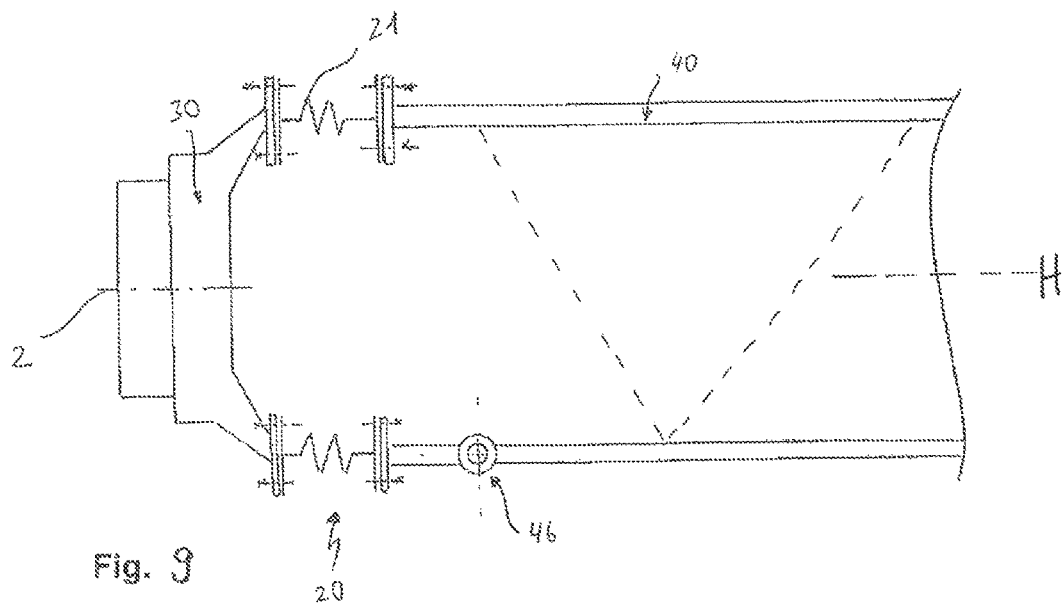
FIG. 9 shows another simplified view of an arrangement of the turbine at the turbine carrier with the possibility of pivoting the turbine.

The joint device 46 can also be provided between a flexible interface 20 and the first structural component part 30 which corresponds, e.g., to a rotor receptacle, so that it is possible to uncouple the rotor from the flexible coupling device or interface and flexible elements 21 forming the latter. This can be advantageous for dismantling a particularly heavy structural component part or a particularly large rotor and thus a heavy turbine T of the wind power installation 1, because then the weight force of the rotor can be conducted directly into the turbine carrier 40 without passing through flexible elements 21. Depending on the configuration of the flexible elements 21, this is also useful with respect to an unnecessary stress and, therefore, a possibly resulting change in the spring properties or damping properties of the flexible elements or of some of the flexible elements 21 (flexible interface). In this respect, it is generally the case that a joint device can be incorporated directly into the force flow, as shown in FIGS. 8 and 9 or as shown in FIG. 7, outside of the force flow and independently or as an auxiliary component of the turbine carrier 40. To this extent, the joint device 46 shown in FIG. 7 can be referred to as an external joint outside the flow of force or alongside the main force flow lines.

Whether an entire rotor together with rotor blades or only a rotor bearing and, as the case may be, further components of a drivetrain can be assembled or dismantled by means of this tilting mechanism will always depend on the strength or load-carrying capacity of the joint device 46 and flexible elements 21. In every case, a joint device according to FIG. 9 or according to one of the following FIGS. 10 and 11 can at least guarantee a simultaneous assembly or disassembly of the rotor without rotor blades but with some additional components or all of the components commonly associated with a drivetrain.

FIG. 8 shows a joint device 36 which allows a rotation (tilting down) of a rotor bearing and of a first structural component part relative to a second structural component part. The joint device 36, e.g., for a wind power installation according to FIG. 7, can be used for this purpose, and the joint device 36 according to FIG. 8 can be arranged directly in the force flow between the rotor bearing, or a receiving device for a rotor bearing, corresponding to a first structural component part and a second structural component part and can form part of the receiving device. The joint device 36 can generally assume the same function as a joint device 46 shown in FIG. 7; the joint device 36 is not arranged between a flexible interface 20 and a stationary supporting structure, but rather between a receiving device 30 forming a first structural component part and the flexible interface 20, in particular as part of the receiving device 30 directly in the force flow between a rotor bearing (not shown), or the receiving device 30 for a rotor bearing, and a second structural component part, i.e., a turbine carrier 40. The joint device 36 accordingly forms a receiving device 30 which comprises at least two structural component parts which are movable relative to one another; depending on the quantity of coupling points or flanges 31, the joint device 36 ensures a relative movement of a rotor (not shown) with respect to at least two flanges 31, and a fixed connection can be ensured in the assembled state by at least one flange 31.

It should be noted that this variant of a joint device 36 does not rule out that the joint device 36 can also be rigidly connected, for example, i.e., blocked, so that there is also the possibility of providing another joint (not shown), e.g., a joint device according to FIGS. 7 and 9, which can also be blocked. In this way, for any application and depending on uncontrollable external factors, e.g., environmental or weather factors, it can be decided whether pivoting is to be carried out on the sprung side around the joint device 36 or on the unsprung side around a joint device at the turbine carrier 40. Accordingly, it may be said that the joint device 36 shown in FIG. 8 is a joint that is arranged on the sprung side in the force flow. During operation, however, the joint device 36 does not assume a major role. Rather, it can be designed in such a way that it is irrelevant in terms of vibration or in terms of the force flow whether a joint device is provided or not.

FIG. 9 shows a variant of the joint 46 which is characterized by an embodiment form which is clearly laid out with regard to overall structure and can also be implemented economically. The joint 46 can be used, for example, in a wind power installation according to FIG. 7, wherein the joint 46 can be arranged directly in the force flow between the rotor bearing, or a receiving device for a rotor bearing, (corresponding to a first structural component part) and a second structural component part or a turbine carrier 40, and can form part of the second structural component part. The joint 46 can be provided directly in the structure of the turbine carrier 40 and accordingly integrated into the turbine carrier 40 itself so that no additional flange connection is required and the assembly or disassembly work is not increased, and there are also no additional sources of error or uncertainty factors. Accordingly, it may be said that the joint 46 shown in FIG. 9 is a joint that is arranged on the unsprung side in the force flow. This joint affects neither an equal distribution of the masses of a receiving device 30 or rotor bearing nor spring characteristics or damping characteristics because it is part of the substantially rigidly bearing-supported turbine carrier 40.

Figure 10:
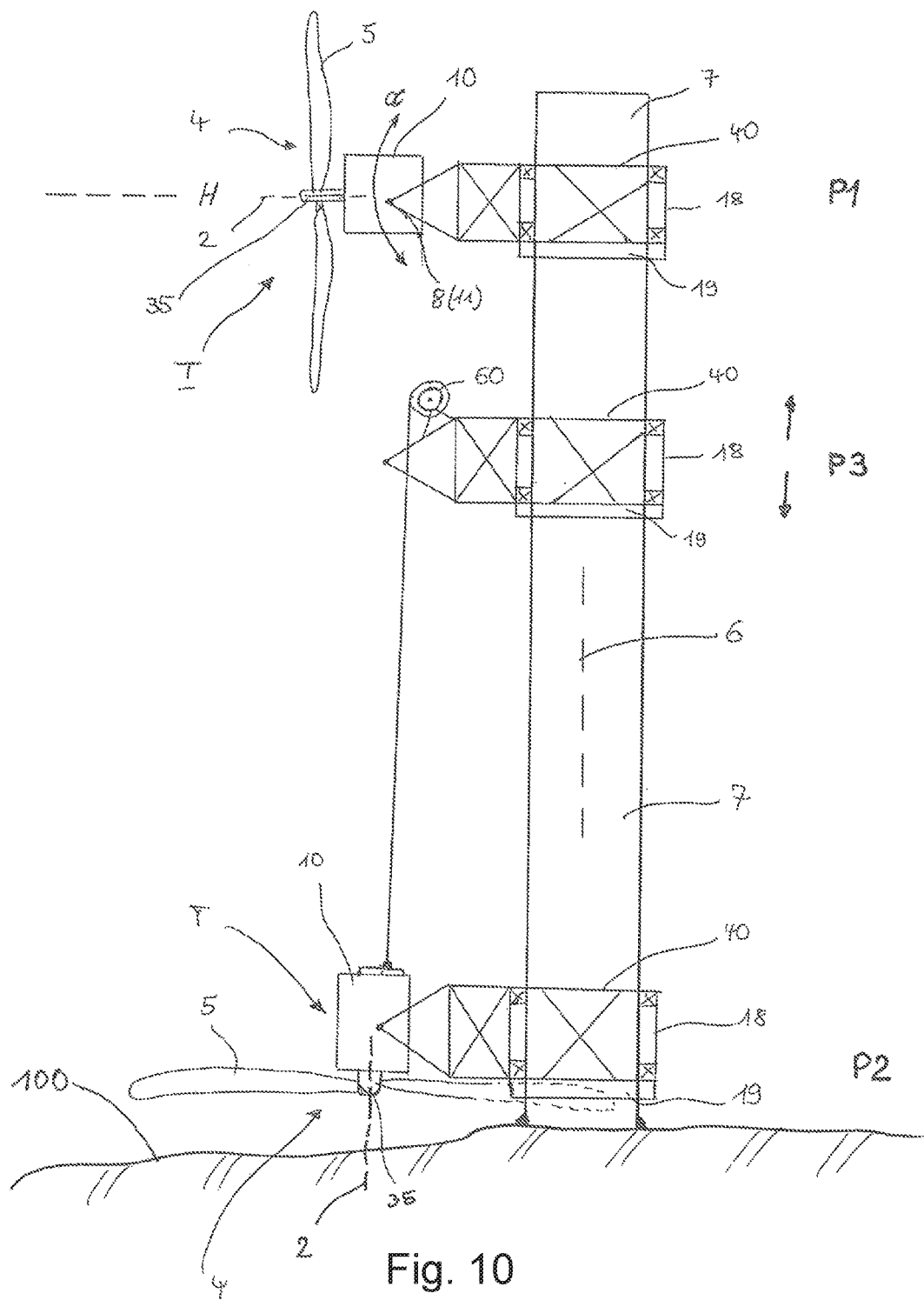
FIG. 10 shows a simplified schematic view of a turbine and a turbine carrier which is arranged on a tower of the wind power installation with the possibility of displacing the turbine carrier and pivoting and lowering the turbine.

FIG. 10 shows a simplified schematic diagram of the turbine T and of the turbine carrier 40 arranged on tower 7 of wind power installation 1 with the possibility of displacing the turbine carrier 40 and the possibility of pivoting and lowering the turbine T in cases where the wind power installation 1 is not in operation. In the diagram in FIG. 10, the same turbine carrier 40 is shown in different positions at the tower 7 of the wind power installation 1.

In the upper position at the tower 7, the turbine carrier 40 is in an operating position in the vicinity of the upper end of the tower 7 or is located in a slightly lowered position as is shown in FIG. 10 so that the turbine T, including the rotor 4 with rotor blades 5 and drivetrain 10 (generally including a gearbox, if necessary, and a generator (neither of which is shown)) is arranged in an operating position or an idle position. The uppermost position is the first position P1. The entire constructional unit of turbine T can be arranged in such a way, depending on the prevailing wind conditions such as wind speed, that the rotation axis 2 of the rotor 4 extends substantially horizontally and the plane of rotation of the rotor blades 5 is substantially perpendicular to the longitudinal extension of the tower 7 or of the substantially horizontal reference plane H shown in FIG. 1. If it is required due to wind conditions that the rotation axis 2 of the rotor 5 be tilted, it is possible, as has been described above in connection with the previous embodiment examples and shown by way of example in FIG. 1, to incline the rotation axis 2 in the first angle range relative to reference plane H in that the entire turbine T is rotated by means of the pivot bearing 11 around the rotation axis 8 relative to the turbine carrier 40. In so doing, the above-mentioned small positive angles α of the first angle range of approximately 0° to 10° can be adjusted relative to the reference plane H (FIG. 1). Under moderate wind conditions, the rotation axis 2 can also remain in the position shown in FIG. 10.

The upper portion of FIG. 10 illustrates the possibility of inclining the turbine T of the wind power installation 1, if necessary, by small angles α (first angle range) as is shown in FIG. 1. This is indicated in FIG. 10 by a curved arrow and designated by α. The possibility of adjusting a predetermined inclination of the rotation axis 2 of the turbine T is separate from the fact that the turbine carrier 40 can be moved selectively and therefore also lowered along the length of the tower 7 at least within a predetermined region. The construction substantially corresponds to the construction shown in FIG. 4 whose basic features were also described with respect to raising or lowering the turbine carrier 40 and tilting the turbine T in connection with FIG. 5.

FIG. 10 likewise shows the displacing device 18 which is mentioned with reference to FIG. 4 and which communicates with the turbine carrier 40, and the holding device 19 is provided in order to secure and anchor the turbine carrier 40 in a determined position (for example, the second position P2 or third position P3) after displacement of the turbine carrier 40 along the tower 7.

Further, the arrangement shown in FIGS. 4 and 10 with the above described functions is separate from the fact that the turbine carrier 40 can be rotated around the longitudinal axis 6 of the tower 7 for adapting to changing wind directions (yaw adjustment).

FIG. 10 further illustrates the possibility of completely lowering the turbine T (until the level of the ground at the foot of the tower 7, second position P2) while the turbine carrier 40 remains at a predetermined height at the tower 7 (intermediate position or third position P3), or of carrying out lowering by lowering both the turbine carrier 40 and the turbine T. The arrangement of the turbine carrier 40 at an intermediate height of the tower 7 as shown in FIG. 10 illustrates that the turbine T can be lowered by means of a corresponding arrangement of cables in conjunction with a winch 60 (lifting device) after releasing the turbine carrier 40. In so doing, the wind power installation 1 is not in operation. For this purpose, the turbine T is rotated around the rotation axis 8 corresponding to the second angle range, the turbine T is released, and the turbine T is lowered along the tower 7 to the ground 100 so that the turbine and, in particular, the rotor hub 35 and associated rotor blades 5 can lie on the earth's surface in a predetermined manner. The turbine T is suitably pivoted when the ground 100 is inclined relative to the tower 7.

The lower part of the diagram in FIG. 10 also illustrates the possibility that the displacing device 18 communicating with the turbine carrier 40 is capable of lowering the turbine carrier 40 completely to the foot of the tower 7 (second position P2) so that in the situation shown in the drawing the turbine carrier 40 and the turbine T are both lowered together and, starting from a predetermined height, the turbine T is tilted by the large angles α (second angle range, relative to the reference plane H which is located within the total angle range) so that the imaginary plane of rotation of the rotor blades 5 is arranged substantially parallel to the ground or, if necessary, arranged in a slightly inclined manner. In so doing, the spatial position of the rotor rotation axis 2 changes, and the turbine T and particularly the rotor blades 5 and the rotor hub 35 can also rest on the ground 100 or on a correspondingly prepared surface.

Accordingly, the yaw rotation around the longitudinal axis 6 of the tower 7, the rotation of the turbine T around the rotation axis 8, and the raising or lowering of the turbine carrier 40 along the length of the tower 7 can be carried out independently from one another. However, the turbine T must be rotated (tilted) before reaching a minimum height of the rotation axis 2 of the rotor 4 above the ground (depending on the length of the rotor blades 5) so as to prevent damage to the rotor blades 5.

Figure 11:
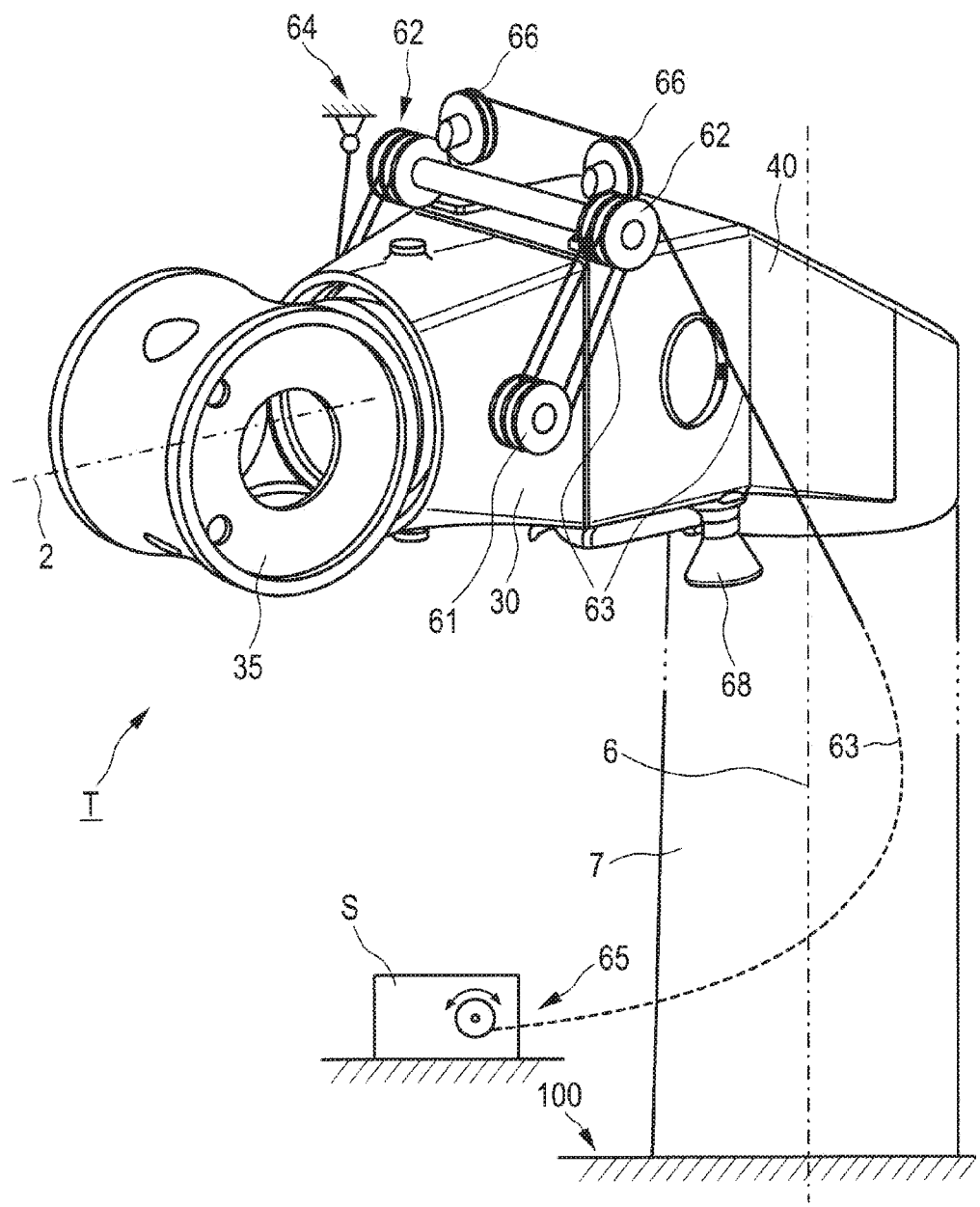
FIG. 11 shows a perspective view of an embodiment of the turbine and arrangement thereof at the turbine carrier with the possibility of pivoting the turbine in conjunction with cable controls.

While simplified, schematic diagrams were used in the preceding figures to illustrate the components involved and their functions, FIG. 11 shows a more specific embodiment form of the arrangement of the turbine T and turbine carrier 40 for rotatable bearing support of the turbine. FIG. 11 shows the turbine T in the installed state received and held by the turbine carrier 40. This can be an idle state or an operating state. The arrangement shown in FIG. 11 does not illustrate the possibilities of slightly tilting the turbine T by small angles α (first angle range) as was shown, for example, in FIG. 1. This possibility of slightly rotating or tilting the turbine T is also provided in FIG. 11, but is not shown in detail. The diagram in FIG. 11 relates particularly to the arrangement of a mechanism for rotating the turbine T downward and subsequently lowering the turbine T to a desired height, preferably to the foot of the tower 7 for resting on the earth's surface (for example, 100 according to FIG. 5).

In the idle position or operating position according to FIG. 11, first pulleys 61 are fastened to the turbine T. The turbine carrier 40 includes second pulleys 62 which are mechanically attached to the turbine carrier 40. In conjunction with the first pulleys 61 and second pulleys 62, a cable 63 is provided, by means of which the first pulleys 61 and second pulleys 62 are connected in the manner of a block and tackle. An end point of the cable 63 is connected to a fixing point 64 which can be arranged, for example, at the turbine carrier 40, and the other end 65 of the cable is guided to a winch S in order to affect the cable length and, accordingly, the relative movement between the turbine T and the turbine carrier 40. The winch S can be a part of the wind power installation 1 or an externally arranged unit. When a corresponding force is exerted on the cable 63 by the winch S, the turbine T can be brought into its operating position or idle position shown in FIG. 11, and it is possible to mechanically connect the turbine T in this position to the turbine carrier 40. Subsequently, the cable 63 can be removed, or the force exerted by the cable 63 can be canceled so that the cable 63 is relaxed and can remain so. A balance of cable force between the first and second pulleys 61 and 62 arranged on the left-hand side and right-hand side, respectively, is ensured by means of third pulleys 66 arranged at the turbine carrier 40. The components 61 to 66 indicated above form a cable control.

The third pulleys 66 bring about an equilibrium of forces and load between the two sides of the arrangement shown in FIG. 11 with only one cable 63 between the pulleys 61, 62 and 66. Without an appropriate cable force equilibrium between the two sides (i.e., between the left-hand side and right-hand side in the diagram in FIG. 11), significantly different forces would occur in the cable 63 under certain operating conditions so that a one-sided load would occur amounting to as much as twice the normal load (standard load with complete equal distribution of occurring forces). It would then be necessary, also at a considerable increase in cost, to dimension the respective elements such as the cable 63, the pulleys 61, 62 and 66 and the fastening thereof for at least twice the load. An uneven load, i.e., a substantially greater load on one side of the cable/pulley arrangement according to FIG. 11, could also occur in the absence of a cable force equilibrium when lowering or raising the turbine T (FIG. 12) in wind when the turbine T experiences a rocking motion as a result of the wind load.

The winch 60 shown in FIG. 10 and arranged at the turbine carrier 40 and the components (first and second pulleys 61 and 62, cable 63 with the fixing point 64, the other end 65 of the cable and the third pulleys 66) form a pivoting means.

FIGS. 12A to 12D of FIG. 12 illustrate the possibility using the arrangement shown in FIG. 11 of raising a turbine T which has been assembled, serviced or repaired, for example, on the ground 100 to the operating position again by means of the cable control (60 to 66) and arranging and fastening it in the turbine carrier 40.

The following illustration is based on the situation in which the turbine T has been completely lowered to the ground 100 and is now to be raised again and moved into the operative position. The illustrations in FIGS. 11 and 12 show only the rotor hub 35 without rotor blades 5 for the sake of simplicity; the rotor blades 5 are mounted before raising the turbine T. In an advantageous and simple manner, the turbine T can be completely assembled in the second position P2 (on the ground 100) before being raised.

Figure 12A:
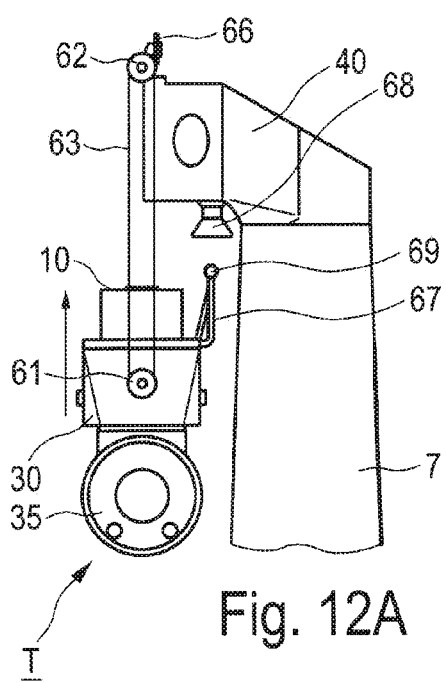
FIGS. 12A to 12D show different illustrations of the process of raising the turbine and arranging the turbine at the turbine carrier based on the design of the turbine and turbine carrier according to FIG. 11.

As is shown in FIG. 12A, the turbine T communicates with the second pulleys 62 of the turbine carrier 40 via cable 63 and first pulleys 61 (at the turbine). When a corresponding force is exerted on the free end 65 of the cable by means of the winch S (not shown in FIG. 12) and the cable 63 is pulled, the turbine T is raised along the tower 7 and arrives in the vicinity of the turbine carrier 40 according to FIG. 12A. If the turbine T is lifted further as is shown in FIG. 12 B and moved in the direction of the turbine carrier 40 along the length of the tower 7, the turbine T enters into engagement with the turbine carrier 40. To this end, the turbine T has a connection arm 67 which is arranged on the side of the turbine T that is on the bottom side of the turbine T after the turbine T has been fully installed in the turbine carrier 40. Further, the turbine carrier 40 includes a safety device or catching device 68 which is arranged in the bottom area of the turbine carrier 40 according to FIGS. 12A to 12D and FIG. 11. The turbine T suspended on the cable 63 is guided upward substantially vertically, and the connection arm 67 enters into engagement with the catching device 68. A rounded end 69 arranged at the connection arm 67 can enter a corresponding recess of the catching device 68 so that the turbine T and the turbine carrier 40 are connected to one another by the above-mentioned elements. In this regard, the turbine T can have at least one connection arm 67 or a plurality thereof.

Figure 12B:
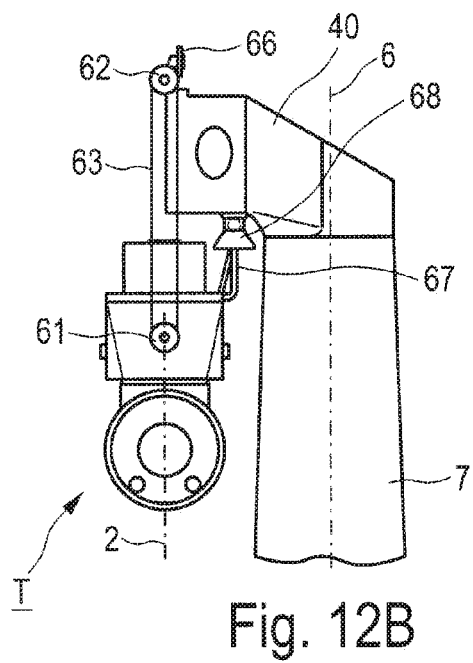
Figure 12C:
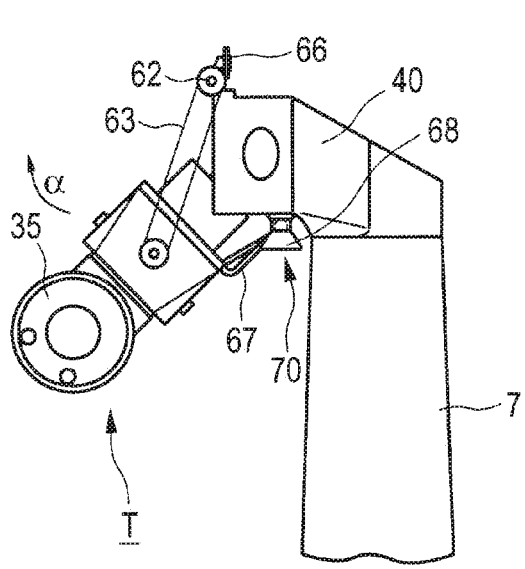
Figure 12D:
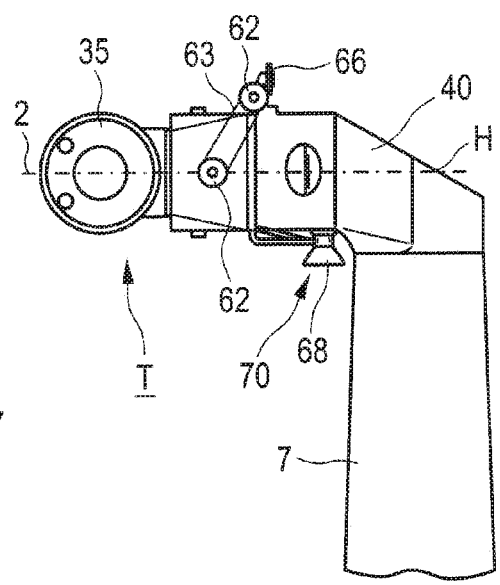

When the rounded end of the connection arm 67 of the turbine T is located in the catching device 68, a pivot 70 can be formed around which the turbine T can rotate when it is moved further in direction of the turbine carrier 40 with reference to FIG. 12C. With continued pulling of the cable 63, turbine T moves upward around the pivot 70 referring to FIG. 12C, so that an end position of this movement is reached as is shown in FIG. 12D, and the position of the turbine T and turbine carrier 40 relative to one another is a normal position or default position as is also shown in FIG. 11. Depending on the operational situation of the turbine carrier, it can be in the first position P1 or third position (intermediate position) P3.

In this situation, the connection arm 67 engages by its rounded end 69 in the catching device 68, and the turbine T can be fixedly connected to the turbine carrier 40 by other technical means such as a screw connection, for example. In this context, it is also possible, for example, according to the diagram in FIGS. 7 to 9, that flexible elements can be arranged between the turbine carrier 40 and the turbine T.

According to FIGS. 11 and 12, the pivot connection 70 formed when the turbine T is moved toward the turbine carrier 40 takes on the function of the fixed pivot connection that was described by way of example in the preceding figures. For example, the functions of the respective pivot joints 36 and 46 in FIGS. 8 and 9 and of the general pivot joint around the rotation axis 8 in connection with the pivot bearing 11 (for example, FIGS. 5 and 10) are adopted.

In FIG. 12, A to D show the turbine T being returned from a position near the ground 100 and the insertion of the turbine T into the turbine carrier 40. Conversely, if the turbine T is to be lowered starting from the situation shown in FIG. 12D, it is necessary to perform the steps in the reverse order in that the turbine T inside the turbine carrier 40 is released, lowered slightly while carrying out the rotational movement around the temporary pivot connection 70 (second angle range), and finally fully lowered by the cable 63 to the desired height, particularly to the ground 100, such that the rotor blades 5 can rest on a correspondingly prepared surface without damage.

According to the arrangement in FIGS. 11 and 12, the wind power installation and particularly the combination of turbine T and turbine carrier 40 further comprise a pivot joint, not shown in these figures, to achieve the slight inclination shown, for example, in FIG. 1 depending on wind conditions (first angle range) and also to achieve a controlled adjustment of the inclination depending on measured wind strengths (FIG. 2). In this case, the turbine T can be tilted slightly out of the default position shown in FIGS. 11 and 12D, in particular by small positive angles $\alpha$ according FIG. 1. In this case, depending on the selected arrangement, the rounded end 69 of the connection arm 67 can no longer make contact in the catching device 68 and accordingly cannot form a pivot connection 70 of this kind. In this case, the rotation axis for providing the slight inclination according to FIG. 1 and the rotation axis for rotating the turbine T to release same from the turbine carrier and for lowering the turbine T, e.g., to the ground, are not identical. The possibility of identical pivots is indicated by way of example in FIGS. 4 and 5.

It should also be noted that an inclination or a rotation of the turbine T of the wind power installation 1 need not necessarily take place around a specific pivot or rotation axis (e.g., rotation axis 8 according to FIGS. 1, 4 and 5); rather, the rotation can also take place by means of a mechanical device or a mechanism such as a four-bar linkage. Accordingly, the pivoting device can have the mechanical device, e.g., the four-bar linkage, as the bearing device. In this regard, the turbine T of the wind power installation 1 can be moved translationally and rotationally relative to the turbine carrier 3 or 40 and can be rotated and, if necessary, shifted after the movement relative to its original location so that it is possible thereafter to lower it completely. In so doing, a combination of translational and rotational movements is carried out which results in the desired pivoting (i.e. to the desired pivoting angle) of the turbine T. A predetermined pivoting line (curve) can be achieved. In this regard, pivoting in the first angle range (during operation of the wind power installation 1) and also with larger pivoting angles in the second angle range (steps for assembly/disassembly or maintenance, before lowering) is possible by means of the mechanical devices.

Therefore, according to the preceding description, the arrangement of a wind power installation 1 with turbine T and turbine carrier 40 comprises a system of levers and fulcrums for the kinematics of the movement particularly of the turbine T in the turbine carrier 40 or in the vicinity of the turbine carrier so as to ensure a better positioning and, at the same time, securer guidance during the movement. In particular, the engagement of the rounded end 69 of the connection arm 67 in the catching device 68 allows the formation of the (at least temporary) pivot connection 70 so as to ensure reliable guidance particularly of the turbine T carrying out a rotational movement, and therefore work can also continue under a predetermined wind load during assembly. In this way, it is possible to carry out assembly in operating situations which would not have been feasible in another known construction of the wind power installation so that further downtimes and outage times of the wind power installation 1 can be avoided according to the present invention.

It is also possible according to FIG. 12A, for example, that the turbine T which is freely suspended at the cable 63 can be rotated again by a predetermined amount, for example, around a rotation axis formed by the first pulleys 61, so that, with regard to the position of the turbine T when lowering in the direction of the ground, it is possible to adapt to an inclined ground surface so that a three-blade rotor, for instance, can be set down without damage.

Notwithstanding the fact that in FIGS. 11 and 12 the turbine T is separated from the turbine carrier 40 and then lowered and can also be connected to the turbine carrier 40 again in the same way starting from the lowered position, the turbine carrier itself is capable of executing a rotation around the vertical axis, i.e., the axis 6 of the tower 7, so that a yaw adjustment can be made.

Further, irrespective of the possibility of lowering the turbine T by means of the cable 63, it is also possible, depending on further requirements and particularly depending on wind conditions, to lower the turbine carrier shown in FIGS. 4, 5 and 10 together with the turbine T to an intermediate height (e.g., the third position P3) e.g., if an excessively strong wind would mechanically and electrically overload the wind power installation 1. The height of the turbine T above the ground 100 (third position P3) is determined by the wind speed itself which can be measured by an anemometer or the like. Since, at a given measured wind speed, the wind speed at a height below the top of the tower can also be predetermined relatively simply or can also be measured by a second anemometer, the location at which a very good yield is still possible, e.g., where the wind power installation 1 can continue to be operated at nominal values but the mechanical and electrical loads on the wind power installation 1 can be significantly reduced, can be predicted with a high degree of certainty and the turbine T can be adjusted to a height of the third position P3. With the present invention, it is no longer necessary to shut down the wind power installation as was the case in the known solutions. This measure can be combined with a pitch adjustment of the rotor blades 5 and a slight tilting of the rotor rotation axis 2 according to the first angle range.

In connection with the assembly process according to FIG. 12 and a similar disassembly to be carried out in the reverse sequence, it is possible to rotate the rotor blades 5 arranged at the rotor hub 35 around their own longitudinal axis (pitch adjustment) while the turbine T is being moved (FIGS. 12A to 12D) so that the effect of a wind load can be reduced in this case. The pitch adjustment is not dependent upon the movement of the turbine T relative to the turbine carrier 40 and thus represents another separate possibility for adjustment.

Figure 13:
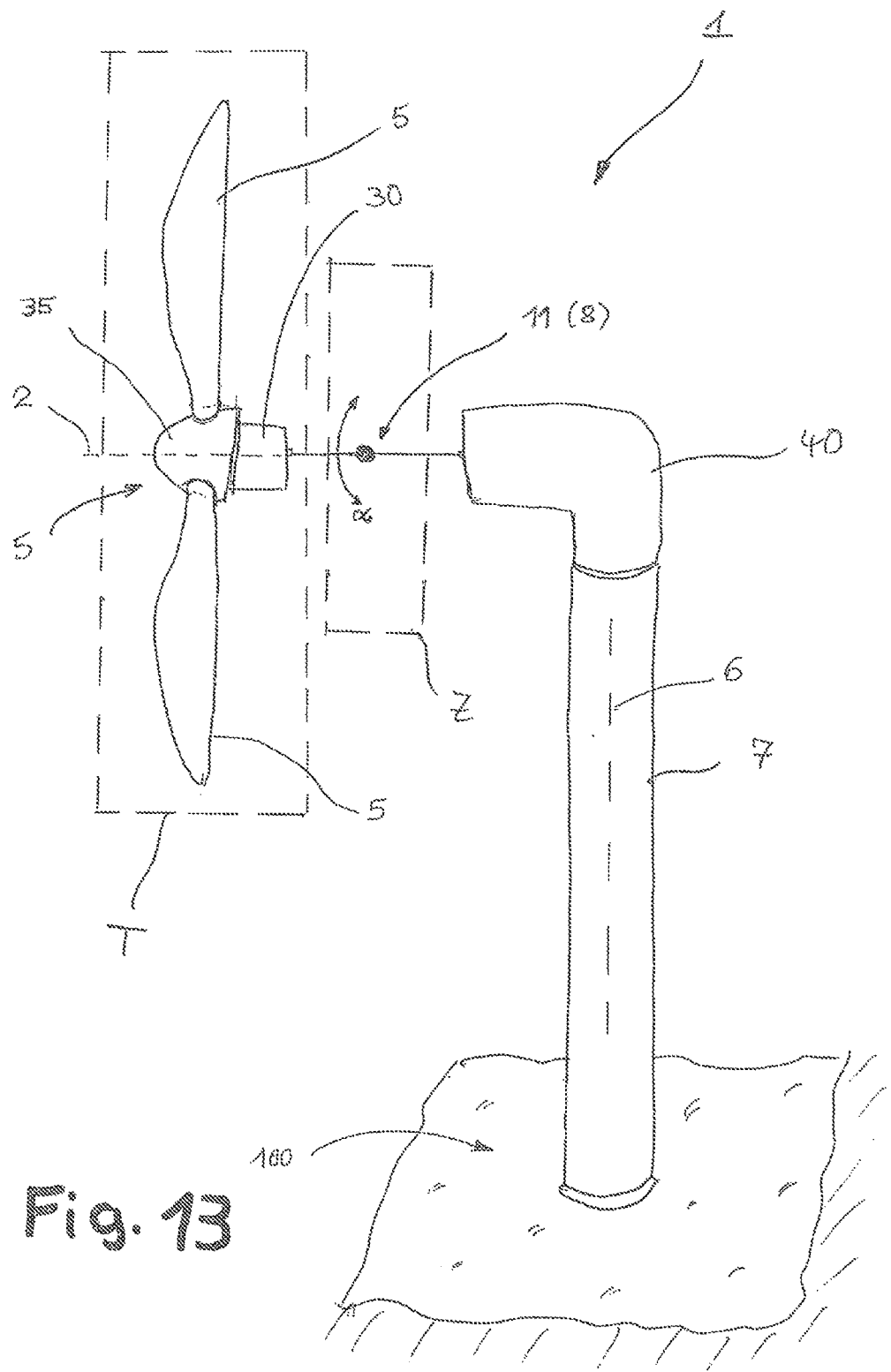
FIG. 13 shows another simplified diagram of an arrangement of the turbine at the turbine carrier illustrating a modular configuration of the wind power installation.

FIG. 13 shows a simplified, schematic illustration of the wind power installation 1 emphasizing an arrangement in the form of different modules as regards the components of the wind power installation.

As in FIGS. 4, 5 and 10, the wind power installation comprises the turbine carrier 40 arranged on the tower 7 (supporting structure). FIG. 13 further shows the turbine T of the wind power installation 1. In a simplified manner, this turbine can comprise the rotor 4 with rotor blades 5 and, for example, rotor hub 35 and receiving device 30. An intermediate element Z is arranged between the turbine T and turbine carrier 40 and essentially comprises the pivot bearing 11 which enables rotation around the rotation axis 8. Accordingly, the intermediate element (intermediate module) Z constitutes a link or interface between the turbine T and the turbine carrier 40.

Accordingly, the wind power installation 1 according to FIG. 13 can comprise in its entirety a first module including, for example, a general support device, e.g., the tower 7. Further, a second module comprising the turbine carrier 40 can be provided. A third module can be formed, for example, as turbine T, and the intermediate element Z (and therefore the fourth module) forms the interface between the second module and third module.

Accordingly, the first module in the form of tower 7 can be formed as a universal support device; a first module can also be formed by the tower 7 and turbine carrier 40. If a standardized interface is formed on the side of the turbine carrier 40 opposite the intermediate module Z, i.e., if standardized connection elements are provided, a plurality of different modules can be arranged at the universal turbine carrier 40 provided that the interfaces and, therefore, the respective mechanical features match.

Therefore, it is possible for the manufacturers of wind power installations to design and produce the respective wind power installation with a modular construction, described above, so that the modules can be configured in different ways depending on different power classes or local conditions at a site of a wind power installation. Further, a manufacturer can also specialize in individual modules so that modules of different manufacturers and of different types can be combined provided the respective connection elements are defined and constructed correspondingly so as to permit a liberal combination of different components (modules). For example, the manufacturer specializing in the production of the module comprising the turbine T can combine his products with the first module (for example, the turbine carrier 40) directly or via the intermediate element Z.

The present invention is not limited to the division of modules described above. Rather, other divisions can also be defined as appropriate.

As a result, the simple displacement of the turbine carrier 40 along the tower 7 (FIGS. 5 and 10) and the ability to lower and raise the turbine T in a simple manner according to the FIGS. 11 and 12 describe simple steps for assembling or disassembling, e.g., for maintenance or repair of the wind power installation 1 in a very economical manner. The arrangement according to FIGS. 11 and 12 and the procedure according to FIG. 12 allow the turbine T to be guided slowly and gently into the standardized position in the turbine carrier 40 (regardless of the position of the turbine carrier 40 itself) while safely guiding the movement and particularly the pivoting of the turbine T. Also, an imaginary axis of the first pulleys 61 can be arranged in such a way that it is arranged in a freely suspended state above the center of gravity of the turbine T and, therefore, after being released from the turbine carrier 40, the turbine T is guided in the initial pivoting movement by the catching device and the connection arm 67; and guiding is subsequently achieved in that the turbine T can occupy a stable position on the cable 63.

To improve guidance, the movement along the tower 7 both when lowering and lifting the turbine T during assembly can be guided in that, for example, guiding can take place by means of correspondingly tensioned cables or by means of rails arranged at the tower in that the turbine T carries out its movement, for example, along the rails arranged on the outer side of the tower. It is also possible that rollers are arranged at the constructional unit forming the turbine T or are arranged prior to lowering and lifting the turbine T so that it can roll on a predetermined surface of the outer surface of the tower 7 in a guided manner.

During the slow and gentle insertion of the turbine T into the turbine carrier 40 according to FIGS. 12A to 12B, the structural members such as flanges and other fastening elements which are provided for attaching the turbine T to the turbine carrier 40 are also treated gently. There is only a very slight risk that these elements will be damaged during the assembly process or disassembly process. Impact forces acting on the tower in connection with the lifting and insertion of the turbine T are also reduced. The gentle guiding of the turbine T when installed in the turbine carrier 40 can also be assisted by means of appropriate damping elements. In this way, unwanted vibrations due to load shocks can be avoided. Further support can be achieved by a corresponding pitch adjustment of the rotor blades to provide a smaller contact surface in case of a wind load. Accordingly, even when impossible in other cases at a predetermined wind load, assembly is possible in connection with the arrangement according to the invention.

The pivoting of the turbine T of the wind power installation 1 allows the turbine T, or the turbine T together with the turbine carrier 40 for multi-blade rotors, to be lowered to the ground 100 close to the tower 7 or lifted to a desired operating position or to the highest possible operating position according to the arrangement of the tower 7 (first position P1). Further, in connection with the rotation of the turbine, e.g., as shown in FIG. 12C, and in reverse order for disassembly and in connection with lowering, a multi-blade rotor having at least three rotor blades can also be set on the ground 100 without having to first disassemble individual rotor blades 5. Assembly time and costs can be substantially reduced in this way. In conjunction with a corresponding pitch adjustment, assembly or disassembly can also be carried out under predetermined wind conditions. Further, when a turbine T is lowered to ground level 100 a multi-blade rotor that is fully assembled on the ground can easily be received and mounted on the tower relatively quickly without having to procure a crane. In so doing, the turbine T is either moved alone or is moved together with the turbine carrier 40 (see FIG. 10).

The basic option of lowering the turbine T along with the turbine carrier 40 makes it possible to arrange the turbine T and turbine carrier in an intermediate position on the tower so that changed wind conditions, and in particular a very strong wind, can be taken into account.

Using the inventive arrangement, the rotor of the turbine T can be completely assembled on the ground beforehand so that easy assembly is ensured substantially without auxiliary mechanical means.

According to the arrangement shown in FIGS. 11 and 12, the joint required for rotation of the turbine T relative to the turbine carrier 40 can be arranged directly in the force flow between the turbine T and the turbine carrier or even outside of the main force flow (see also FIGS. 9 to 11). In the latter case, the pivot or rotation axis need not necessarily lie in the turbine carrier 40; rather, the turbine T can also be supported on another structure such as tower 7 as a supporting structure during the tilting or rotating process. However, the funnel-shaped catching device 68 at the turbine carrier 40 is itself a suitable device for ensuring that the turbine T is inserted gently during assembly or slid out gently during disassembly after pivoting.

Using the inventive arrangement of the wind power installation 1, several measures can be undertaken to adjust the power of the wind power installation 1 depending on wind conditions. It is possible to change the effective rotor surface by means of the pitch adjustment in that the rotor blades are rotated around their longitudinal axis. The rotation can be influenced by way of control or adjustment. In excessively strong wind which can affect the performance and stability of the wind power installation 1, it is possible in accordance with the above description to move the turbine T and turbine carrier 40 down to a lower height along the tower so the wind strength to be taken into account is reduced due to the lower height above the ground 100. Further, for example, according to the diagram in FIG. 1, the turbine T can be inclined in the turbine carrier 40 by a few degrees, for example, by 4° to 10° (of the first angle range) by means of the pivot bearing 11 so that safe operation of the wind power installation 1 is also ensured by this tilting. As a result, the turbine T can be rotated in the turbine carrier, for example, according to FIGS. 4, 5 and 10, by the entire angle range of at least 120°. The entire angle range includes the first angle range with small angles in the upward direction (about 0° to at least 10°) and the second angle range with angles in the downward direction of the second angle range of 0° to at least 110°. The first angle range and second angle range are considered in relation to the substantially horizontal reference plane H (FIGS. 1, 4 and 10). Accordingly, the horizontal reference plane H lies within the total angle range.

By the measures of rotating or pivoting the turbine of the wind power installation relative to the reference plane H, lowering the turbine T together with the turbine carrier 3 or 40 (with turbine T already pivoted or still in the operating position) and, independent therefrom, the rotation of the rotor blades 5 around their longitudinal axis (pitch), many opportunities are afforded for influencing the operation of the wind power installation 1 or substantially facilitating assembly or disassembly, depending on need, wind conditions and the site where the wind power installation 1 is set up.

Expenditure on assembly and disassembly is considerably reduced because the devices installed in the wind power installation 1 for raising and lowering the turbine T and turbine carrier 3 and 40 make do without the use of a crane which very often leads to bottlenecks with respect to procurement and is costly. When the towers of wind power installations are higher, for example, more than 150 m, it is virtually impossible to procure a crane for lifting the corresponding masses of turbine T and turbine carrier 3 or 40. The arrangement according to the invention which makes do without a crane makes it possible to increase the height of the towers of wind power installations to ranges where there is a greater wind speed and the power outputs of the wind power installation can therefore be increased to a greater extent than provided by an increase of the rotor blade surface (greater rotor blade length). The wind power installation 1 according to the invention makes it possible to exploit wind speed ranges with higher yields without a correspondingly sharp rise in costs. In terms of yield, a larger tower height is better than a longer rotor blade length. The tower height can be further increased as a result of the convenient option of assembling and disassembling the wind power installation 1 according to the invention (built-in crane function) without the use of a crane. This also applies particularly to offshore applications, where it is hardly possible to procure a crane for the masses and heights in question.

The above measures can also be introduced independently from each other. It is only when lowering the turbine carrier 40 to a lower height (e.g., position P3 in FIG. 10) that the tilting of the turbine T may not exceed a certain amount so as to prevent collision between the rotor blades 5 and the upper end of the tower 7.

The present invention also comprises the following further aspects. The wind power installation can be provided with a rotor having two or optionally more rotor blades. The rotor is connected to a generator for generating electric power, and the rotor and generator are received by a main frame having a bearing structure which makes it possible during operation of the wind power installation to displace the main frame along a tower to which the wind power installation can be coupled. The bearing structure is connected to the tower via at least one holding device and is designed to hold the main frame at a desired height which preferably depends upon the wind speed at the desired height. In so doing, the bearing structure can allow a rotation of the main frame around the vertical axis of the tower. In addition, the bearing structure can have a displacing unit for displacing the main frame along the tower, specifically from the foot of the tower to the top of the tower.

A method for operating a wind power installation can be configured in such a way that a wind power installation is displaced by a drivetrain comprising a rotor and a generator in that the drivetrain is displaceable along the longitudinal axis of the tower, and the height of the drivetrain above the ground can be adjusted particularly depending on the wind speed.

A wind power installation of this kind having a rotor which has two or optionally more rotor blades, wherein the rotor is connected to a generator for generating electrical energy and the wind power installation comprises a main frame carrying the rotor and generator which form a drivetrain, can also be constructed in such a way that the rotor has a predetermined rotor axis inclination by an angle α and the rotor is pivotable around a pivot to change the rotor axis inclination, and that at least one drive is provided for the pivoting movement of the rotor or of the drivetrain, and that the drive is supported at the main frame and exerts an adjustable force on the drivetrain. The drive can be formed, e.g., by a hydraulic cylinder, but can also be formed by an electric motor or an alternative, rotational or linear actuator. In this regard, the rotor axis inclination can be adjusted (changed) to a predetermined value depending on the wind speed and/or the load on the rotor blades of the wind power installation. Further, to determine the predetermined value of the rotor axis inclination, forces on the rotor blades can be measured, the measured values can be processed in a computer according to a predetermined mathematical function, and the calculated value can be adjusted for rotor axis inclination by adjusting the drive for the pivoting movement of the drivetrain. Further, the rotor of the wind power installation can have a hub within which is accommodated a gearbox which receives the torque of the rotor on the input side and which is connected on the output side to the rotating parts of the generator. A clutch which is preferably designed as an elastomer coupling can be provided for transmitting the torque of the rotor to the gearbox so that the transmission of axial forces to the rotor and, therefore, to the hub and gearbox can be minimized. The wind power installation can be coupled to a tower on which the main frame is bearing-mounted. The drivetrain can be arranged at a lateral distance from the tower, and the pivot or rotation axis can be offset lateral to the tower for pivoting and adjusting the rotor axis inclination.

The present invention has been described with reference to embodiment examples in conjunction with the accompanying drawings.

However, it will be self-evident to skilled persons active in this field that the configuration of the present invention according to the above-described figures and the reference numerals used in the drawings and description for the respective structural component parts and components and exemplary specifications are not limiting. Accordingly, the invention is not limited to the depiction, particularly the dimensions and configurations, given in the figures. All of the embodiment forms and variants covered by the appended patent claims are considered to belong to the invention.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wind power installation comprising:
   a turbine comprising:
      a rotor which has a plurality of rotor blades, and which is rotatably bearing-supported for rotation around a rotor rotation axis; and
      a generator for generating electrical power, the generator being connected to the rotor; and
   a turbine carrier which receives the turbine, the turbine carrier being rotatably arranged at a supporting structure,
   wherein the turbine is movably mounted in the turbine carrier by a bearing device so that the spatial position of the turbine in the turbine carrier can be modified;
   wherein a pivoting range of the turbine, corresponding to a pivoting range of the rotor rotation axis, includes a first angle range, in which the turbine is pivoted when the wind power installation is in operation, and a second angle range, in which the turbine is pivoted when the wind power installation is not in operation, relative to a horizontal reference plane, with the total angle range of the pivoting range being at least 120°;
   wherein the turbine carrier and the turbine include a pivoting device configured to pivot the turbine around the second angle range when the wind power installation is not in operation; and
   wherein the turbine carrier has a further bearing device in which the turbine is rotatably mounted temporarily during pivoting in the pivoting range according to the second angle range.

2. The wind power installation according to claim 1;
   wherein the bearing device comprises a pivot bearing; and
   wherein:
      the turbine is supported by the pivot bearing so as to be pivotable around a rotation axis; or
      the bearing device for the pivoting of the turbine has a mechanical device which comprises a four-bar linkage.

3. The wind power installation according to claim 2;
   wherein the pivot bearing is arranged in the vicinity of a center of gravity of the turbine.

4. The wind power installation according to claim 1;
   wherein the turbine carrier includes an actuator configured to pivot the turbine around the first angle range during operation of the wind power installation.

5. The wind power installation according to claim 1;
   wherein the further bearing device is configured to temporarily engage with at least one connection arm arranged at the turbine during pivoting; and
   wherein engagement between the turbine and the further bearing device is releasable by means of the pivoting device at the conclusion of the pivoting process.

6. The wind power installation according to claim 5;
wherein the pivoting device has a cable control configured to movably hold the turbine during the pivoting process and to release the engagement at the conclusion of the pivoting process.

7. The wind power installation according to claim 6;
wherein the pivoting device is configured to lower the turbine in the pivoted position by means of the cable control.

8. The wind power installation according to claim 1;
wherein the turbine carrier has a displacing device configured to move the turbine carrier along the supporting structure between an uppermost position at an upper end of the supporting structure and a lowermost position at the foot of the supporting structure.

9. The wind power installation according to claim 8;
wherein the turbine carrier has a holding device configured to carry and secure the turbine carrier at any position along the supporting structure.

10. The wind power installation according to claim 1;
wherein the pivoting device comprises first pulleys at the turbine, and the first pulleys are arranged at the turbine in the vicinity of a center of gravity of the turbine.

11. A method for operating a wind power installation including a rotor which has a plurality of rotor blades and which is rotatably bearing-supported for rotation around a rotor rotation axis, wherein the rotor is connected to a generator for generating electrical power, and the rotor and the generator form a part of a turbine which is received by a turbine carrier, and the turbine carrier is rotatably bearing-supported on a supporting structure, the method comprising:
with the rotor stopped:
actuating a pivoting device to temporarily rotatably mount the turbine in a further bearing device of the turbine carrier and to pivot the turbine according to a predetermined angle range such that the rotor rotation axis is approximately perpendicular to a reference plane; and
further actuating the pivoting device to:
dismount the turbine from the further bearing device;
lower the turbine from a first position along the supporting structure to a lowermost position at a foot of the supporting structure; and
set down the turbine on a ground surface.

* * * * *